(12) United States Patent
Lee et al.

(10) Patent No.: US 11,553,068 B2
(45) Date of Patent: Jan. 10, 2023

(54) CONTACT STRUCTURE AND ELECTRONIC DEVICE INCLUDING SAME

(71) Applicant: Samsung Electronics Co., Ltd., Suwon-si (KR)

(72) Inventors: Soogyu Lee, Suwon-si (KR); Joonwon Chang, Suwon-si (KR); Minsoo Kim, Suwon-si (KR); Kyujin Kwak, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 16/958,878

(22) PCT Filed: Jan. 8, 2019

(86) PCT No.: PCT/KR2019/000242
§ 371 (c)(1),
(2) Date: Jun. 29, 2020

(87) PCT Pub. No.: WO2019/139321
PCT Pub. Date: Jul. 18, 2019

(65) Prior Publication Data
US 2020/0344335 A1    Oct. 29, 2020

(30) Foreign Application Priority Data

Jan. 15, 2018    (KR) .................... 10-2018-0005249

(51) Int. Cl.
*H04M 1/02*        (2006.01)
*H01R 24/60*       (2011.01)

(52) U.S. Cl.
CPC ............ *H04M 1/026* (2013.01); *H01R 24/60* (2013.01)

(58) Field of Classification Search
CPC ..... H02S 20/00; H04M 1/0202; H04M 1/026; H04M 1/0274; H04M 1/0277; H04M 1/02;
(Continued)

(56) References Cited

U.S. PATENT DOCUMENTS

| 2012/0148195 A1* | 6/2012 | Umeno ................ G02B 6/3817 439/38 |
| 2014/0184057 A1 | 7/2014 | Kim et al. |

(Continued)

FOREIGN PATENT DOCUMENTS

| EP | 3 151 339 A1 | 4/2017 |
| JP | 2010-146877 A | 7/2010 |

(Continued)

OTHER PUBLICATIONS

Extended European Search Report dated Jun. 15, 2021, issued in European Patent Application No. 19738665.9.
(Continued)

*Primary Examiner* — Nathan S Taylor
(74) *Attorney, Agent, or Firm* — Jefferson IP Law, LLP

(57) ABSTRACT

An electronic device according to various embodiments of the present invention comprises: a housing that includes a first plate oriented in a first direction, a second plate oriented in a second direction opposite to the first direction, and a side member covering a space between the first plate and the second plate; a printed circuit board disposed in the space of the housing; a contact structure that is processed and formed toward at least one side of the printed circuit board from the side member of the housing and provides a contact point with an external electronic device; and a contact point structure that is disposed between the contact structure and the printed circuit board. The contact structure includes: at least one contact part of which at least a part is exposed to (Continued)

an external space and is made of the same material as the side member; and an insulating part, disposed around the at least one contact part, for separating the contact part and the side member from each other.

15 Claims, 17 Drawing Sheets

(58) Field of Classification Search
CPC .... H01R 24/60; H01R 12/57; H01R 12/7076; H01R 13/2457; H01R 2201/16; H01R 2107/00; H01R 107/00; H01R 13/625; B63B 2035/4453; B63B 2209/18; B63B 2231/50; B63B 39/10
See application file for complete search history.

(56) References Cited

U.S. PATENT DOCUMENTS

| | | | | |
|---|---|---|---|---|
| 2014/0273546 A1* | 9/2014 | Harmon | ............ | H01R 13/6205 439/39 |
| 2014/0317329 A1* | 10/2014 | Barnett | ................ | G06F 1/1635 710/304 |
| 2015/0119114 A1* | 4/2015 | Smith | ....................... | H01F 7/02 455/566 |
| 2015/0349847 A1* | 12/2015 | Hassan-Ali | .......... | H04B 5/0037 455/41.1 |
| 2017/0068276 A1* | 3/2017 | Wagman | ................ | G06F 3/0202 |
| 2017/0093070 A1* | 3/2017 | Tryon | .................... | H01R 13/03 |
| 2017/0093087 A1* | 3/2017 | Esmaeili | ............ | H01R 13/6205 |
| 2017/0205847 A1* | 7/2017 | Wagman | ............ | H01R 13/6205 |
| 2017/0257146 A1* | 9/2017 | Szeto | ....................... | H04W 4/80 |
| 2018/0004250 A1* | 1/2018 | Barnett | ................. | G06F 1/1688 |
| 2020/0006880 A1* | 1/2020 | Esmaeili | ................. | H01R 13/03 |
| 2021/0194257 A1* | 6/2021 | Taha | ......................... | H02J 7/02 |
| 2021/0311524 A1* | 10/2021 | Pinciuc | ................. | G01R 33/096 |

FOREIGN PATENT DOCUMENTS

| | | |
|---|---|---|
| KR | 10-2013-0089479 A | 8/2013 |
| KR | 10-2015-0102072 A | 9/2015 |
| KR | 10-1580546 B1 | 12/2015 |
| KR | 10-1650397 B1 | 8/2016 |
| KR | 10-1687779 B1 | 12/2016 |
| KR | 10-2017-0049390 A | 5/2017 |
| KR | 10-2017-0114891 A | 10/2017 |

OTHER PUBLICATIONS

Korean Office Action dated Dec. 15, 2021, issued in Korean Patent Application No. 10-2018-0005249.

* cited by examiner

CONTACT STRUCTURE AND ELECTRONIC DEVICE INCLUDING SAME

CROSS-REFERENCE TO RELATED APPLICATION(S)

This application is a U.S. National Stage application under 35 U.S.C. § 371 of an International application number PCT/KR2019/000242, filed on Jan. 8, 2019, which is based on and claimed priority of a Korean patent application number 10-2018-0005249, filed on Jan. 15, 2018, in the Korean Intellectual Property Office, the disclosure of which is incorporated by reference herein in its entirety.

BACKGROUND

1. Field

Various embodiments of the disclosure relate to a contact structure and an electronic device including the same.

2. Description of Related Art

The term "electronic device" may mean a device, such as an electronic scheduler, a portable multimedia reproducer, a mobile communication terminal, a tablet PC, an image/sound device, a desktop PC, a laptop PC, or a vehicular navigation system, as well as a home appliance, that performs a specific function according to a program installed therein. The above-mentioned electronic devices may output, for example, information stored therein as sound or an image. As the degree of integration of electronic devices has increased and super-high-speed and large-capacity RF communication has become popular, multiple functions have recently come to be provided in a single electronic device, such as a mobile communication terminal. For example, various functions, such as an entertainment function (e.g., a game function), a multimedia function (e.g., a music/video reproduction function), a communication and security function for mobile banking or the like, a schedule management function, and an e-wallet function, are integrated in a single electronic device, in addition to a communication function.

The electronic device may include a connector (e.g., a USB or an earphone jack) to be connected with a peripheral electronic device. In general, the connector may be designed such that a hole is formed in a portion of an electronic device requiring contact and an electrically conductive material is inserted into the hole so as to connect the connector to a printed circuit board (PCB) inside the electronic device.

SUMMARY

With the connector structure of an electronic device for electrical connection with an external electronic device, additional tasks, such as a process of forming a hole in the case of the electronic device and a process of inserting a separate connection structure into the hole, are required in order to make a structure for connecting the contact point outside the electronic device with a printed circuit board (PCB) inside the electronic device, which may increase time and manufacturing costs.

According to various embodiments of the disclosure, it is possible to provide a contact structure capable of being physically connected to an external electronic device using a contact terminal formed by cutting and injection-molding a portion of a metal housing of an electronic device, and an electronic device including the contact structure.

According to various embodiments of the disclosure, it is not required to design a separate hole in the housing of an electronic device or to provide an additional structure for connecting with a printed circuit board. Thus, it is possible to provide a contact structure capable of reducing additional costs and simplifying a design process and an electronic device including the same.

An electronic device according to various embodiments of the disclosure may include: a housing including a first plate that is oriented in a first direction, a second plate that is oriented in a second direction opposite to the first direction, and a side member that surrounds a space between the first and second plates; a printed circuit board disposed in the space of the housing; a contact structure formed by being processed to face at least one surface of the printed circuit board from the side member of the housing, the contact structure being configured to provide a contact point with an external electronic device; and a contact point structure disposed between the contact structure and the printed circuit board. The contact structure may include: at least one contact portion which is at least partially exposed to an external space and is made of the same material as the side member; and an insulating portion disposed around the at least one contact portion so as to space the contact portion and the side member apart from each other.

An electronic device according to various embodiments may include: a housing including a front plate, a rear plate facing a direction opposite the direction faced by the front plate, and a side member surrounding a space between the front plate and the rear plate, wherein the side member is integrally formed with the rear plate or disposed to be in contact with the rear plate, is formed of a first conductive material, and includes a plurality of through holes formed so as to be aligned along one portion of the side member; an electrical connector including a plurality of conductive pins, each of which is at least partially disposed in one of the through holes and is formed of the first conductive material, and a plurality of insulating structures at least partially inserted into the through holes in order to electrically insulate the conductive pins from the side member; a printed circuit board positioned inside the space; an electronic component mounted on the printed circuit board; and at least one conductive path disposed between the electronic component and the conductive pins.

With the contact structure according to various embodiments of the disclosure and the electronic device including the same, it is possible to provide a structure that can be electrically connected to an external electronic device, using a contact terminal formed by processing a portion of the metal housing of the electronic device.

With the contact structure according to various embodiments of the disclosure and the electronic device including the same, it is possible to configure the contact terminals in the metal housing through insert injection molding without separately designing holes in the housing of the electronic device, thereby reducing costs, simplifying a design process, reducing the size of a mounting space, and slimming and miniaturizing the electronic device.

With the contact structure according to various embodiments of the disclosure and the electronic device including the same, it is possible to configure the contact terminals through injection molding in the metal housing, thereby blocking foreign matter that may be introduced from the outside, such as dust and/or moisture.

DETAILED DESCRIPTION

Figure 1:
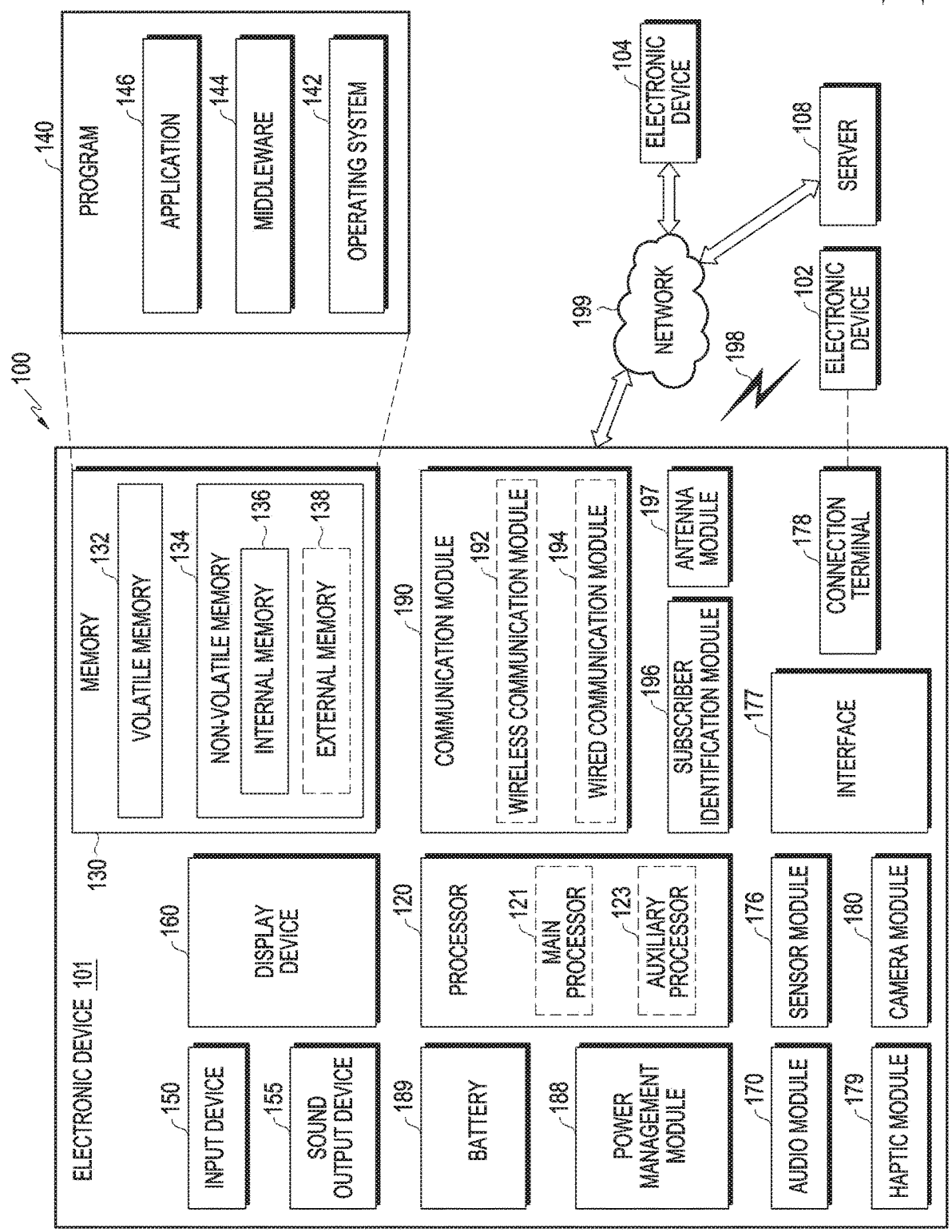
FIG. 1 is a block diagram illustrating an electronic device within a network environment 100 according to various embodiments of the disclosure.

The electronic device according to various embodiments may be one of various types of electronic devices. The electronic devices may include, for example, a computer device, a portable communication device (e.g., a smart phone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular expression may include a plural expression, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Such terms as "1st" and "2nd," or "first" and "second" may represent corresponding components regardless of order or importance, may be used to simply distinguish one component from another, and do not limit the corresponding components. When it is described that an element (e.g., a first element) is "(operatively or communicatively) coupled with/to" or "connected" to another element (e.g., a second element), the element can be directly connected to the other element or can be connected to the other element through another element (e.g., a third element).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including an instruction that is stored in a machine-readable storage medium (e.g., internal memory 136 or external memory 138) that is readable by a machine (e.g., a computer). The machine is a device capable of invoking the stored instruction and operating according to the invoked instruction, and may include the electronic device (e.g., the electronic device 101) according to the embodiments set forth herein. When the instruction is executed by the processor (e.g., the processor 120), the processor may perform functions corresponding to the instruction directly, or functions corresponding to the instruction can be performed using other components under the control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each component (e.g., a module or a program) according to various embodiments may include a single entity or multiple entities. Some of the above-described sub-components may be omitted, or one or more other sub-components may be added to various embodiments. Alternatively or additionally, some components (e.g., modules or programs) may be integrated into a single entity, and the single entity may still perform one or more functions of each of some components in the same or similar manner as they are performed by a corresponding one of some components before the integration. According to various embodiments, operations performed by the module, the program, or another component may be carried out sequentially, in parallel, repeatedly, or heuristically, or one or more of the operations may be executed in a different order or omitted, or one or more other operations may be added. Hereinafter, according to various embodiments, an electronic device will be described with reference to the accompanying drawings. The term "user" herein may refer to a person who uses an electronic device, or a device (e.g., an artificial intelligence electronic device) which uses an electronic device.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera assembly 180, a power management module 188, a battery 189, a communication module 190, a subscriber identification module (SIM) 196, or an antenna module 197. In some embodiments, at least one (e.g., the display device 160 or the camera assembly 180) of the components may be omitted from the electronic device 101, or one or more other components may be added in the electronic device 101. In some embodiments, some of the components may be implemented integrated and implemented as in, for example, the sensor module 176 (e.g., a fingerprint sensor, an iris sensor, or an illuminance sensor) embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load and process a command or data received from another component (e.g., the sensor module 176 or the communication module 190) in volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121. Additionally or alternatively, the auxiliary processor 123 may be adapted to consume less power than the main processor 121, or to be specific to a specified function. Here, the auxiliary processor 123 may be operated separately from or embedded in the main processor 121.

In such a case, the auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera assembly 180 or the communication module 190) functionally related to the auxiliary processor 123. The memory 130 may store various data used by at least one component (e.g., the processor 120 or the sensor module 176) of the electronic device 101, for example, software (e.g., the program 140) and input data or output data for a command related thereto. The memory 130 may include the volatile memory 132 or the non-volatile memory 134.

The program 140 is software stored in the memory 130, and may include, for example, an operating system (OS) 142, middleware 144, or an application 146.

The input device 150 is a device configured to receive a command or data to be used by a component (e.g., the processor 120) of the electronic device 101, from the outside (e.g., a user) of the electronic device 101, and may include, for example, a microphone, a mouse, or a keyboard.

The sound output device 155 is a device configured to output sound signals to the outside of the electronic device 101, and may include, for example, a speaker or a receiver. The speaker may be used for general purposes, such as playing multimedia or playing record, and the receiver may be used only for incoming calls. According to an embodiment, the receiver may be implemented as separate from, or as part of the speaker.

The display device 160 is a device configured to visually provide information to a user of the electronic device 101, and may include, for example, a display, a hologram device, or a projector and control circuitry to control a corresponding one of the display, hologram device, and projector. According to an embodiment, the display device 160 may include touch circuitry or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an internal operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be used for the electronic device 101 to be coupled with the external electronic device (e.g., the electronic device 102) wiredly or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera assembly 180 may capture a still image or moving images. According to an embodiment, the camera assembly 180 may include one or more lenses, image sensors, image signal processors, or flashes.

The power management module 188 is a module configured to manage power supplied to the electronic device 101, and may be implemented as at least part of, for example, a power management integrated circuit (PMIC).

The battery 189 is a device configured to supply power to at least one component of the electronic device 101, and may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip or may be implemented as separate chips, respectively.

According to an embodiment, the wireless communication module 192 may identify and authenticate the electronic device 101 in a communication network, using user information stored in the subscriber identification module 196.

The antenna module 197 may include at least one antenna module for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the function requested or an additional function, and transfer an outcome of the performing to the electronic device 101. The electronic device 101 may provide the function or service requested, with or without further processing of the received outcome. To that end, a cloud computing, distributed computing, or client-server computing technology may be used, for example.

Figure 2:
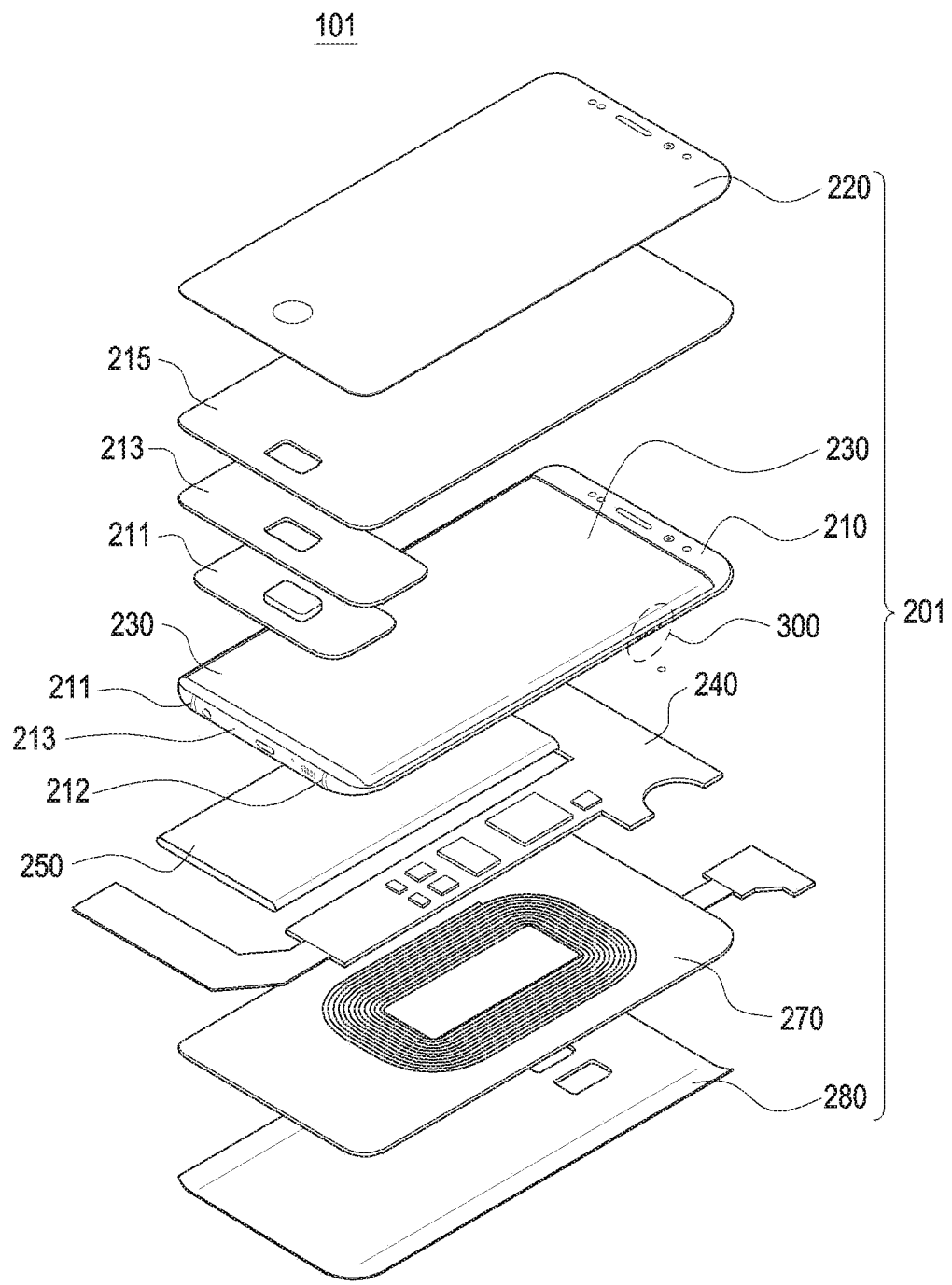
FIG. 2 is an exploded perspective view illustrating an electronic device 101 according to one of various embodiments of the disclosure.

FIG. 2 is an exploded perspective view illustrating an electronic device 101 according to one of various embodiments of the disclosure.

Referring to FIG. 2, according to one of various embodiments of the disclosure, the electronic device 101 may include a housing 201, a display module 220, a wireless communication circuit (e.g., the communication module 190 in FIG. 1), a printed circuit board 240, a battery 250, an antenna panel 270, and a contact structure 300 (e.g., an electrical connector). The configuration of the electronic device 101 of FIG. 2 may be partially or wholly the same as the configuration of the electronic device 101 of FIG. 1.

According to various embodiments, the housing 201 may include a front plate (e.g., a window cover of the display module 220), a rear plate (e.g., a rear cover) opposite to the front plate, and a side member (e.g., a side bezel structure 210 and a support member 230 (e.g., a bracket)) surrounding the space between the front plate and the rear plate.

According to various embodiments, the side bezel structure 210 and the support member 230 form the body of the electronic device 101. For example, the support member 230 may be disposed inside the electronic device 101 so as to be connected to the side bezel structure 210, or may be integrally formed with the side bezel structure 210.

According to various embodiments, the support member 230 may be formed of, for example, a metal material and/or a non-metal (e.g., a polymer) material. The support member 230 may have one surface to which the display module 220 is coupled and another surface to which the printed circuit board 240 is coupled. A processor (e.g., the processor 120 in FIG. 1), memory (e.g., the memory 130 in FIG. 1), and/or an interface (e.g., the interface 177 in FIG. 1) may be mounted on the printed circuit board 240. The processor may include at least one of, for example, a central processing unit, an application processor, a graphics processor, an image signal processor, a sensor hub processor, or a communication processor.

According to various embodiments, the side bezel structure 210 of the housing 201 may have a rectangular shape including four side surfaces, and at least a portion of the side bezel structure 210 may be made of a conductive material. For example, the side bezel structure 210 may include a plurality of non-conductive portions 211 and 212 and a conductive portion 213 inserted and disposed between the non-conductive portions along at least one of the side surfaces. At least a portion of the conductive portion 213 made of a conductive material in the side bezel structure 210 may be used as an antenna device, for example, a radiation conductor. As another example, a portion of the side bezel structure 210 is insulated from the other portion of the support member 230, and is electrically connected to a communication module to be used as an antenna device.

According to an embodiment, the support member 230 may include a battery space formed to accommodate the battery 250. The battery 250 is accommodated in the battery space, and may be arranged parallel to the printed circuit board 240 rather than overlapping the printed circuit board 240. The battery 250 may be electrically connected to the printed circuit board 240.

According to various embodiments, the battery 250 is a device for supplying power to at least one component of the electronic device 101, and may include, for example, a non-rechargeable primary battery, a rechargeable secondary battery, or a fuel cell. At least a portion of the battery 250 may be disposed on substantially the same plane as, for example, the printed circuit board 240. The battery 250 may be integrated with and disposed inside the electronic device 101, or may be detachably disposed on the electronic device 101.

According to various embodiments, the display module 220 may be supported by the side bezel structure 210 and the support member 230. The display module 220 may be disposed to face the printed circuit board 240, with the support member 230 interposed therebetween. When the support member 230 is made of a conductive material, the electromagnetic waves generated by the operation of the display module 220 are blocked by the support member 230 made of a conductive material so that the electromagnetic waves can be prevented from flowing into the printed circuit board 240, and the electromagnetic waves generated by the operation of the printed circuit board 240 are blocked by the support member 230 made of a conductive material so that the electromagnetic waves can be prevented from flowing into the display module 220.

According to various embodiments, a front cover (not illustrated) may be attached to one surface of the display module 220. The front cover may be made of glass or a transparent reinforced resin. According to an embodiment, the material of the front cover is not limited to glass or a reinforced resin, and may be made of various materials that are transparent and rigid. An image output from the display module may be implemented on the front cover.

According to an embodiment, the display module 220 may be coupled to or disposed adjacent to a fingerprint detection panel 211, a pressure sensor panel 213 capable of measuring the intensity (pressure) of a touch, and/or a digitizer panel 215 configured to sense a magnetic-field-type stylus pen.

According to various embodiments, the contact structure 300 (e.g., an electrical connector) may be disposed in an area of the support member 230 and the side bezel structure 210 of the electronic device 101 so as to provide an electrical connection to an external electronic device. The contact structure 300 may be electrically connected to the printed circuit board 240 inside the electronic device 101, and may be used as a data communication terminal and/or a charging terminal, depending on the type of the external electronic device.

According to an embodiment, the contact structure 300 may be formed through cutting and insert injection molding of a structure of a side area of the housing 201 of the electronic device. For example, since the contact structure 300 is implemented by processing the housing 201 made of metal, the contact structure 300 may be made of the same material as the housing 201, and an additional structure may not be required. A detailed description of the contact structure 300 will follow.

According to various embodiments, the antenna panel 270 may be disposed between the rear plate 280 and the battery 250. The antenna panel 270 may include, for example, a nearfield communication (NFC) antenna, a wireless charging antenna, and/or a magnetic secure transmission (MST) antenna. The antenna panel 270 may perform short-range communication with, for example, an external electronic device, or may transmit/receive power required for charging to/from the external device in a wireless manner. In another embodiment, an antenna structure may be formed by the side bezel structure 210, a portion of the support member 230, or a combination thereof.

According to various embodiments, the rear cover 280 is mounted on the rear surface of the support member 230 while enclosing the printed circuit board 240 and the battery 250, and may form the external appearance of the electronic device 101 together with the side bezel structure 210 and the front cover of the display module. According to an embodiment, the rear cover 280 may be detachably coupled to the bracket 230, and a user may replace a storage medium (e.g., a subscriber identification module (a SIM card) or an SD card) or the battery 250 in the state in which the rear cover 280 is removed. As another example, the rear cover 280 may be formed as a uni-body with the support member 230 so as to prevent the user from arbitrarily removing the rear cover 280 from the support member 230.

Figure 3:
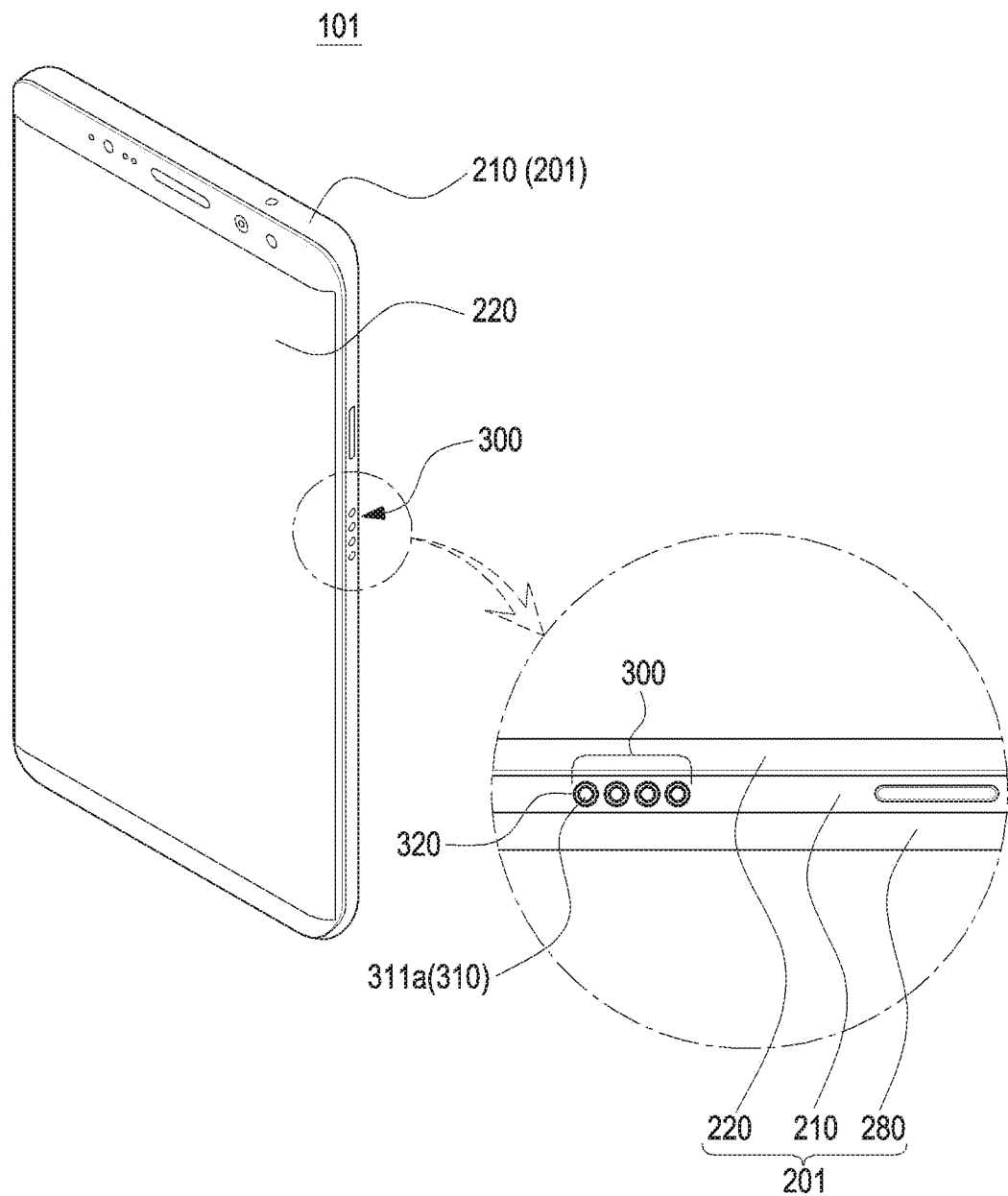
FIG. 3 is an enlarged view of the contact structure 300 formed in a side area of the housing 201 of the electronic device 101 according to one of various embodiments of the disclosure.
Figure 4:
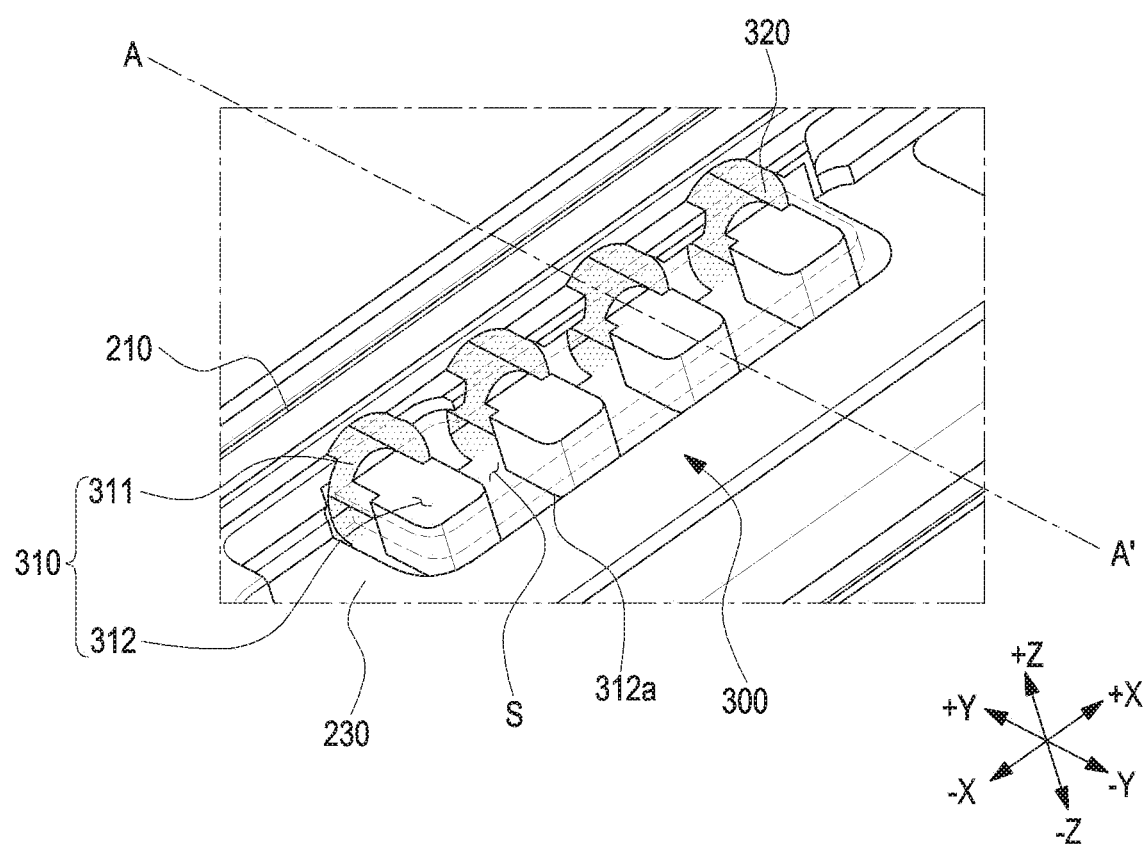
FIG. 4 is a perspective projection view of a contact structure 300 according to one of various embodiments of the disclosure, when viewed from above.

FIG. 3 is an enlarged view of the contact structure 300 formed in a side area of the housing 201 of the electronic device 101 according to one of various embodiments of the disclosure. FIG. 4 is a perspective projection view of a contact structure 300 according to one of various embodiments of the disclosure, when viewed from above.

In FIG. 4, "X" in an orthogonal coordinate system of three axes may indicate the longitudinal direction of the contact structure 300, "Y" may indicate the width direction of the contact structure 300, and "Z" may indicate the thickness direction of the contact structure 300. In addition, in an embodiment, "Z" may indicate a first direction (+Z) and a second direction (−Z), "Y" may indicate a third direction (+Y) and a fourth direction (−Y), and "X" may indicate a fifth direction (+X) and a sixth direction (−X).

Referring to FIGS. 3 and 4, the electronic device 101 according to one of various embodiments of the disclosure may include a housing 201 including a side bezel structure 210 and a support member 230, and a contact structure 300. The housing 201 including the side bezel structure 210 and the support member 230 and the contact structure 300 in FIGS. 3 and 4 may be entirely or partially the same as the housing 201 including the side bezel structure 210 and the support member 230 and the contact structure 300 in FIG. 2.

According to various embodiments, the contact structure 300 may be disposed in an area S in the side surface of the housing 201. For example, the contact structure 300 may be disposed over the side bezel structure 210 and at least the area S in the support member 230.

According to various embodiments, the contact structure 300 may include at least one contact portion 310 (e.g., a plurality of conductive pins) made of the same material as the side bezel structure 210 and/or the support member 230, and an insulating portion 320 (e.g., a plurality of insulating structures) disposed in the peripheral portion around the at least one contact portion 310. The contact portion 310 may be manufactured by processing at least a portion of the side bezel structure 210 and/or the support member 230 through a process such as cutting (e.g., computer numerical control (CNC) processing). In fact, one surface of the contact portion 310 exposed to the outside (oriented in the third direction (+Y)) may form an electrical contact with an external electronic device. The insulating portion 320 may be disposed in combination with the contact portion 310 through insert injection molding and cutting, and may block the electrical flow in the contact portion 310 from flowing to other structures.

According to various embodiments, a plurality of contact structures 300 may be formed in the area S. Respective contact structures 300 may have the same shape, and may be arranged side by side in the area S. The respective contact structures 300 may be arranged in the longitudinal direction along the third direction (+Y) or the fourth direction (−Y), and the plurality of arranged contact structures 300 may be disposed to be spaced apart from each other at regular intervals in the fifth direction (+X) or the sixth direction (−X), perpendicular to the third and fourth directions (+Y and −Y).

According to various embodiments, the contact portions 310 of the contact structure 300 are made of a metal material, and each of the contact portions 310 may include a first portion 311 formed in a shape penetrating the side bezel structure 210 and a second portion 312 extending from the first portion 311 and disposed up to a portion of the support member 230.

According to an embodiment, the first portion 311 may include a first contact surface 311a exposed to the outside of the electronic device, and the first contact surface 311a may be formed as a flat surface or a curved surface having a predetermined slope so as to form a contact point with an external electronic device. For example, the first portion 311 including the first contact surface 311a may be manufactured in a cylindrical shape. As another example, the second portion 312 may include a second contact surface 312a in which the surface oriented in the second direction (−Z) is exposed inside the electronic device, and the second contact surface 312a may come into contact with structures inside the electronic device so as to provide a contact point. The other structures may include contact point structures such as a printed circuit board 240 disposed inside the electronic device and/or a conductive path such as a clip. For example, the second portion 312 including the second contact surface 312a may be manufactured in a quadrangular prism shape.

According to an embodiment, the first contact surface 311a of the first portion 311 and the second contact surface 312a of the second portion may be arranged so as to be oriented in directions perpendicular to each other. For example, the first contact surface 311a may be disposed to be oriented in the third direction (+Y) so as to provide an area with which a contact point of an external electronic device can be brought into contact, and the second contact surface 312a may be disposed to be oriented in the second direction (−Z) so as to provide a contact point with an inner structure.

According to various embodiments, the insulating portion 320 of the contact structure 300 may be disposed to surround at least a portion of the contact portion 310. The insulating portion 320 may be manufactured such that an insulating material such as a resin is coupled to the contact portion 310, made of metal, through an injection-molding process. In the area in which the insulating portion 320 is coupled to the contact portion 310, the first contact surface 311a and the second contact surface 312a of the contact part 310, which requires electrical contact, may be excluded. For example, the insulating portion 320 may be disposed to surround the first portion 311, other than the first contact surface 311a. As another example, the insulating portion 320 may be disposed between the second portion 312 and the support member 230 such that the second portion 312 other than the second contact surface 312a does not come into contact with the housing 201.

According to various embodiments, the insulating portion 320 of the contact structure 300 may be disposed on each of a plurality of arranged contacts having the same structure. For example, the insulating portion 320 is disposed to enclose the periphery of the first portion 311 of each of four contact portions 310, and respective insulating portions 320 may be arranged in the fifth direction (+X) and/or the sixth direction (−X) at regular intervals.

The contact structure 300 according to an embodiment of the disclosure does not have a configuration in which holes are provided in the side surface of the housing and a terminal is disposed between every adjacent hole, but may be manufactured by separately forming a side area of the housing 201, made of a metal material, through cutting, and forming an insulating material therearound through injection molding. With the contact structure 300 according to an embodiment of the disclosure, it is possible to reduce costs, to simplify the design process, to reduce the mounting space in the electronic device 101, and to slim and miniaturize the electronic device 101. In addition, it is possible to block foreign substances such as dust and/or moisture that may be introduced from the outside.

Figure 5:
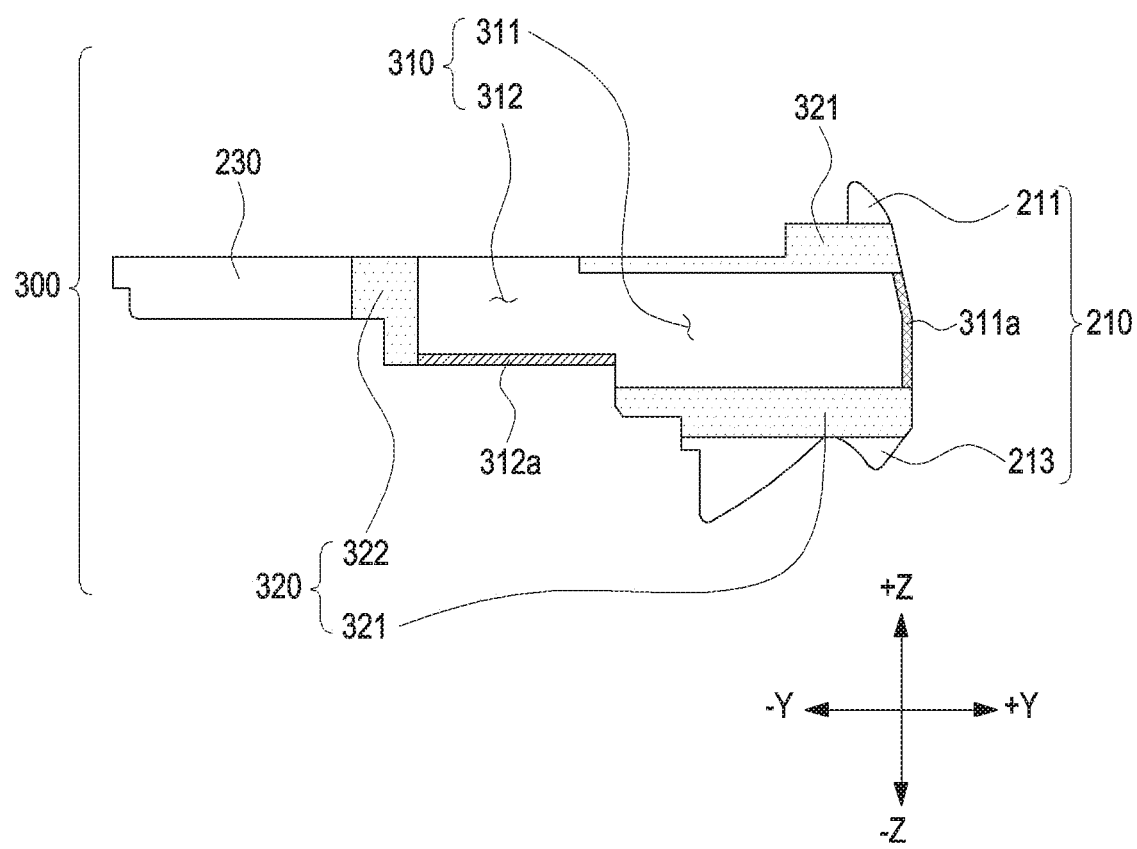
FIG. 5 is a cross-sectional view of the contact structure 300 according to one of various embodiments of the disclosure, taken along line A-A' in FIG. 4.
Figure 6:
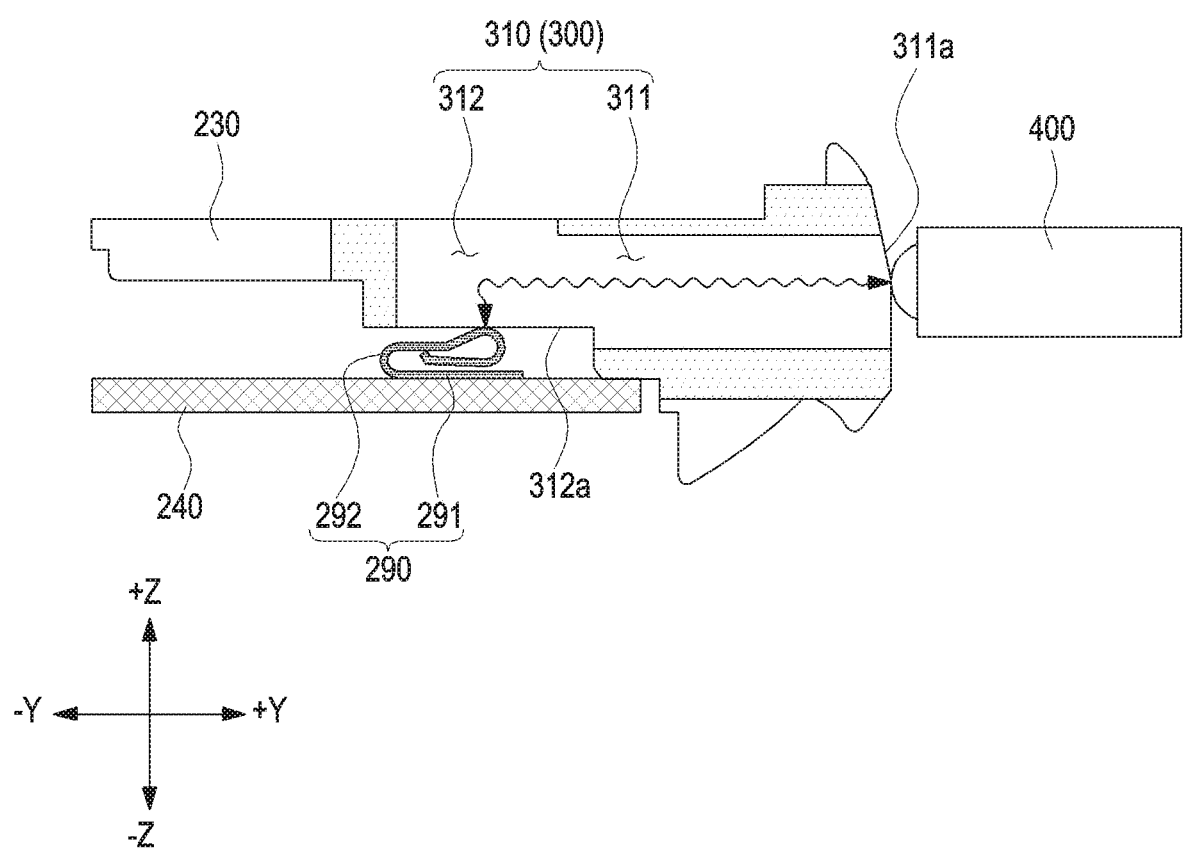
FIG. 6 is a cross-sectional view illustrating the structure in which the contact structure 300 according to one of various embodiments of the disclosure is connected to an external electronic device, taken along line A-A' in FIG. 4.
Figure 7:
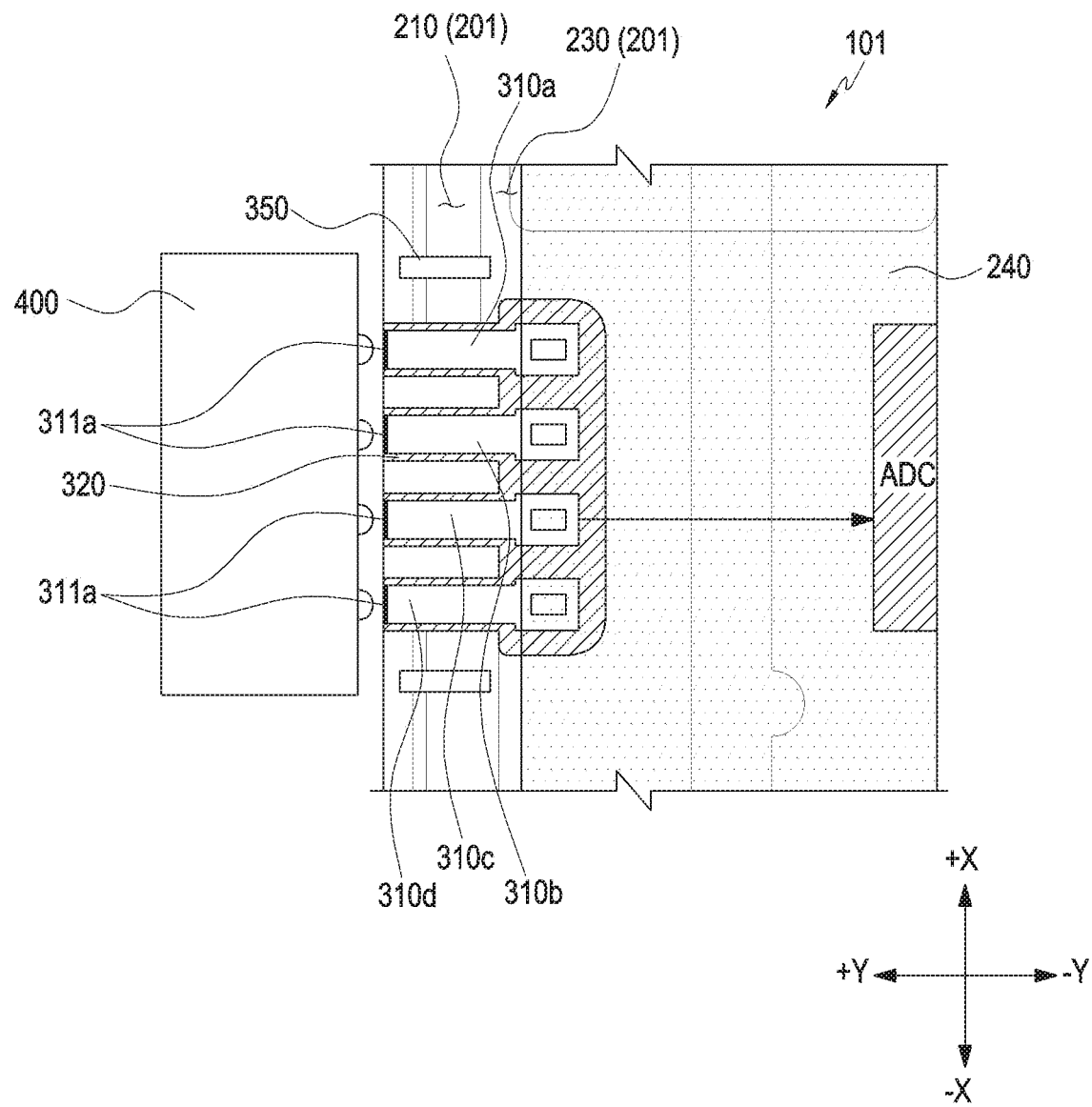
FIG. 7 is a top view illustrating the structure in which the contact structure 300 according to one of various embodiments of the disclosure is connected to an external electronic device.

FIG. 5 is a cross-sectional view of the contact structure 300 according to one of various embodiments of the disclosure, taken along line A-A' in FIG. 4. FIG. 6 is a cross-sectional view illustrating the structure in which the contact structure 300 according to one of various embodiments of the disclosure is connected to an external electronic device 400, taken along line A-A' in FIG. 4. FIG. 7 is a top view illustrating the structure in which the contact structure 300 according to one of various embodiments of the disclosure is connected to an external electronic device 400.

In FIGS. 5 to 7, "X" in an orthogonal coordinate system of three axes may indicate the longitudinal direction of the contact structure 300, "Y" may indicate the width direction of the contact structure 300, and "Z" may indicate the thickness direction of the contact structure 300. In addition, in various embodiments, "Z" may indicate a first direction (+Z) and a second direction (−Z), "Y" may indicate a third direction (+Y) and a fourth direction (−Y), and "X" may indicate a fifth direction (+X) and a sixth direction (−X).

Referring to FIGS. 5 to 7, the electronic device 101 according to one of various embodiments may include a housing 201 including a side bezel structure 210 and a support member 230, a printed circuit board 240, a contact point structure 290, and a contact structure 300. The housing 201 including the side bezel structure 210 and the support member 230, the printed circuit board 240, and the contact structure 300 in FIGS. 5 to 7 may be entirely or partially the same as the housing 201 including the side bezel structure 210 and the support member 230 and the contact structure 300 in FIG. 2.

According to various embodiments, the contact structure 300 may be disposed in an area of the side surface of the housing 201. For example, the contact structure 300 may be disposed over the side bezel structure 210 and at least the area S in the support member 230. According to various embodiments, the contact structure 300 may include at least one contact portion 310 made of the same material as the side bezel structure 210 and/or the support member 230, and an insulating portion 320 disposed in the peripheral portion around the at least one contact portion 310.

According to various embodiments, a plurality of contact structures 300 may be provided, and may form an arrangement in which the contact structures 300 are spaced apart from each other at regular intervals along the longitudinal direction of the electronic device. The contact portion 310 of the contact structure 300 may include a first portion 311 penetrating the side bezel structure 210 of the housing 201 and a second portion 312 extending from the first portion 311 to the support member 230 of the housing 201.

According to an embodiment, the first portion 311 may include a first contact surface 311*a* exposed in the third direction (+Y). The first contact surface 311*a* may be formed as a flat or partially curved surface in order to form a contact point with an external electronic device or the like. The first portion 311 may be coupled to the first insulating portion 321 formed through injection-molding, and the first insulating portion 321 may be disposed to surround an area other than the first contact surface 311*a* of the first portion 311. The first portion 311 and a portion of the side bezel structure 210 may be disposed to be spaced apart from each other, with the first insulating portion 321 interposed therebetween. For example, a portion 211 formed in the first direction (+Z) of the side bezel structure 210 spaced apart from the first portion 311 by the first insulating portion 321 may be formed as a structure for supporting a display module (e.g., the display module 220 in FIG. 2) or a digitizer panel (e.g., the digitizer panel 215 in FIG. 2). As another example, a portion 213 of the side bezel structure 210 formed in the second direction (−Z) and spaced apart from the first portion 311 by the first insulating portion 321 may be formed as a structure for supporting a rear cover (e.g., the rear cover 280 in FIG. 2).

According to an embodiment, the second portion 312 may include a second contact surface 312*a* exposed in the second direction (−Z) inside the electronic device. The second contact surface 312*a* may be configured as a flat surface in order to form a contact point with an inner structure of the electronic device. The second portion 312 may be coupled to the second insulating portion 322 formed through injection molding, and the second insulating portion 322 may be disposed on the surface of the second portion 312 that is oriented in the fourth direction (−Y). The second portion 312 and a portion of the support member 230 may be disposed to be spaced apart from each other, with the second insulating portion 322 interposed therebetween. For example, the support member 230 spaced apart from the second portion 312 by the second insulating portion 322 may be formed as a structure that supports electronic components such as a printed circuit board 240 disposed therein without connecting the electronic components to the second portion 312.

Referring back to FIGS. 6 and 7, the contact portion 310 of the contact structure 300 may include a first portion 311 penetrating the side bezel structure 210 of the housing 201 and a second portion 312 extending from the first portion 311 to the support member 230 of the housing 201.

According to various embodiments, the electronic device may form an electrical contact point with an external electronic device 400 through the first portion 311 of the contact structure 300, and may include therein a contact point structure (e.g., a conductive path) 290 forming an electrical contact point with the second portion 312 and a printed circuit board 240.

According to various embodiments, the contact point structure 290 is disposed between the second contact surface 312*a* and the printed circuit board 240, and may transfer, to the printed circuit board 240, current provided from the first contact surface 311*a* of the contact structure 300 to the second contact surface 312*a*. The contact point structure 290 may include a first portion 291 disposed on one surface of the printed circuit board 240 and a second portion 292 extending from the first portion so as to be in contact with the second contact surface 312*a*, and may be configured to be flexible such that the second portion 312 can be elastically moved relative to the first portion 311. The elastic movement can stably maintain the electrical contact point with the printed circuit board 240 regardless of shaking of the electronic device 101.

According to various embodiments, the above-mentioned processor (e.g., the processor 120 in FIG. 1), memory (e.g., the memory 130 in FIG. 1), and/or interface (e.g., the interface 177 in FIG. 1) may be mounted on the printed circuit board 240. The processor may include at least one of, for example, a central processing unit, an application processor, a graphics processor, an image signal processor, a sensor hub processor, or a communication processor. The printed circuit board 240 may be supported by the insulating portion 320 surrounding the contact portion 310 of the contact structure 300, and may be disposed so as to prevent the printed circuit board 240 from coming into direct contact with the contact structure 300.

According to various embodiments, one or more magnetic elements (e.g., the magnets 350) may be disposed in an end area of the contact structure 300. For example, the magnets 350 may be disposed at opposite ends of the contact structure disposed in the longitudinal direction of the electronic device 101 (e.g., the fifth direction (+X) and/or the sixth direction (−X)), respectively, and may be disposed to be spaced apart from the contact portion 310 of the contact structure 300 so as to prevent the contact portion 310 of the contact structure 300 from being electrically affected.

According to an embodiment, when the magnets 350 are disposed around the contact structure 300, a stable contact point can be maintained through magnetic coupling with an external electronic device 400 having a magnet disposed therein. For example, the external electronic device 400 may include a metal material in an area that corresponds to the magnets 350 and is a peripheral area around the contact point, or at least a portion of the external electronic device 400 may be made of a metal material.

According to various embodiments, the contact structure 300 of the electronic device 101 may include a plurality of contact portions 310 arranged in the longitudinal direction of the electronic device. The contact portions 310 are arranged to be spaced apart from each other at the same interval, and may provide different functions.

Table 1 below illustrates four contact portions 310a, 310b, 310c, and 310d of the contact structure 300 and functions according to the same. However, the number of contact portions 310a, 310b, 310c, and 310d is not limited thereto, and depending on the design, various numbers of contact portions may be provided for energizing and/or charging the electronic device 101 and the external electronic device 400.

TABLE 1

| PIN | Name | Description |
| --- | --- | --- |
| 1 | VCC | +5 VDC |
| 2 | D | Data |
| 3 | ID/Detection | USB OTG ID |
| 4 | GND | Ground |

Referring to Table 1, the contact portions 310a, 310b, 310c, and 310d exposed to the outside of the electronic device 101 may include a first contact portion 310a, a second contact portion 310b, a third contact portion 310c, and a fourth contact portion 310d. For example, the first contact portion 310a may be a VCC line, the second contact portion 310b may be a data line, the third contact portion 310c may be a sensing line, and the fourth contact portion 310d may be a ground. The first contact portion 310a and the fourth contact portion 310d may be provided as power lines for receiving power from the outside or supplying power to an external device, and the second contact portion 310b may be provided as a line for transmitting data to the external device. The third contact portion 310c may be provided as a sensing line capable of sensing foreign matter from the outside, such as moisture, that comes into contact therewith.

For example, in each of the contact portions 310 of the electronic device 101, only the first contact surface 311a is not applied with a coat that is not electrically conductive and prevents corrosion. Alternatively, after a coat is applied over the entire exterior side bezel structure area of the housing 201, the coat on the first contact surface 311a may be removed. Since the first contact surfaces 311a exposed to the outside are not coated for energization and are connected to the internal printed circuit board 240, energization or corrosion may occur. In the electronic device, among the plurality of contact portions, it is possible to prevent corrosion of the first contact surface 311a by forming the third contact portion 310c, which provides information for preventing corrosion.

Referring to the corrosion prevention method according to various embodiments, first, the electronic device 101 may generally perform an operation in a low-power mode (LPM). For example, the third contact portion 310c (e.g., an ID line) exposed to the outside is controlled such that the minimum sensing current flows therein, and the outputs of the remaining contact portions 310a, 310b, and 310d may be blocked. As the current flowing in the third contact portion 310c, a minimum current of about 1 μA or less that is capable of sensing foreign matter may be applied.

Thereafter, when an external resistance comes into contact with the contact structure 300 including the third contact portion 310c, the third contact portion 310c may sense the external resistance value. The external resistance value may be determined through an analog-digital converter (ADC) of a component in the electronic device 101.

According to an embodiment, when the external resistance value determined through the ADC is 0 V, it is recognized as a normal plug of an external electronic device, the low-power mode (LPM) is released, and an operation is performed in a normal mode (NM). For example, normal communication and/or charging may be performed.

According to an embodiment, when the external resistance value determined through the ADC is not 0 V, it is recognized as foreign matter, and the LPM (low-power mode) operation of the electronic device 101 may be maintained. Corrosion of the first contact surface 311a exposed to the outside of the electronic device may be prevented through the operation using the third contact portion 310c.

FIGS. 8A to 10B are views illustrating a sequence of a process for manufacturing the contact structure 300 according to various embodiments of the disclosure.

In FIGS. 8A to 10B, "X" in an orthogonal coordinate system of three axes may indicate the longitudinal direction of the contact structure 300, "Y" may indicate the width direction of the contact structure 300, and "Z" may indicate the thickness direction of the contact structure 300. In addition, in various embodiments, "Z" may indicate a first direction (+Z) and a second direction (−Z), "Y" may indicate a third direction (+Y) and a fourth direction (−Y), and "X" may indicate a fifth direction (+X) and a sixth direction (−X).

Referring to FIGS. 8A to 10B, the electronic device according to one of various embodiments of the disclosure may include a housing 20 including a side bezel structure 210 and a support member 230, and a contact structure 300. The housing 201 including the side bezel structure 210 and the support member 230 and the contact structure 300 in FIGS. 8A to 10B may be entirely or partially the same as the housing 201 including the side bezel structure 210 and the support member 230 and the contact structure 300 in FIG. 2.

Figure 8A:
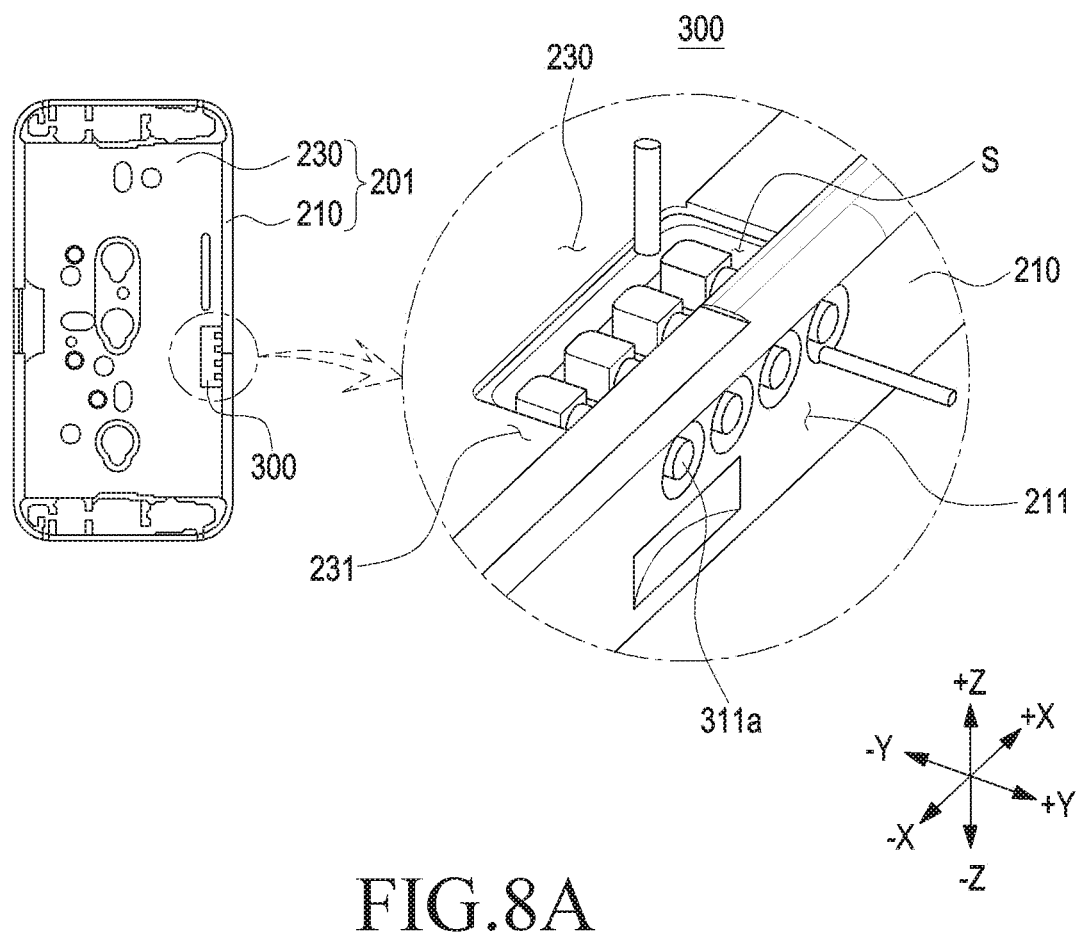
FIG. 8A shows a view illustrating the front surface of the housing 201 that is subjected to primary processing as one of the manufacturing processes of the contact structure, and an enlarged perspective view illustrating the primary processing process for manufacturing the contact structure 300 of the housing 201.
Figure 8B:
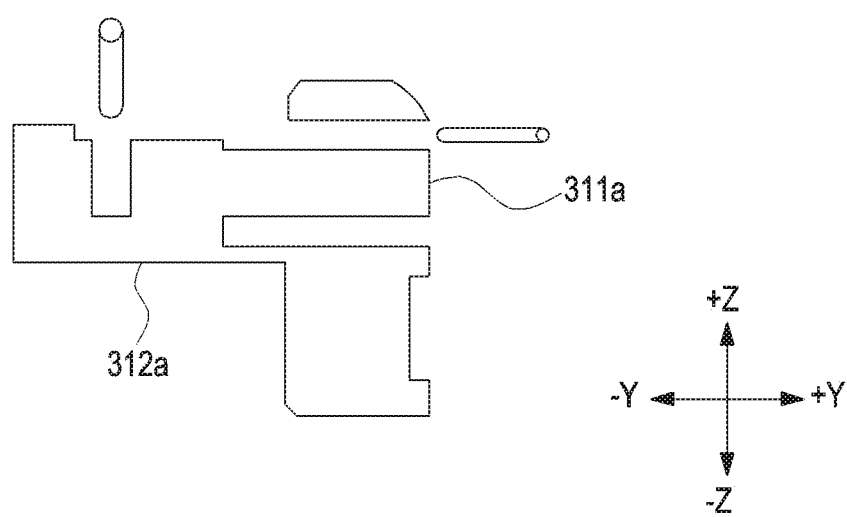
FIG. 8B is a cross-sectional view illustrating the primary processing process for manufacturing the contact structure 300 as one of the manufacturing processes of the contact structure 300 according to an embodiment of the disclosure.

FIG. 8A shows a view illustrating the front surface of the housing 201 that is being subjected to primary processing as one of the manufacturing processes of the contact structure 300, and an enlarged perspective view illustrating the primary processing process for manufacturing the contact structure 300 of the housing 201. FIG. 8B is a cross-sectional view illustrating the primary processing process for manufacturing the contact structure 300 as one of the manufacturing processes of the contact structure 300 according to an embodiment of the disclosure.

Referring to FIGS. 8A and 8B, after providing the housing 201 including a side bezel structure 210 and a support member 230 made of a metal, a primary processing process may be performed. The primary processing process may be performed as a process of cutting, in advance, a metal area corresponding to an area to be filled through injection molding in the final shape of the housing 201.

According to various embodiments, the area S in which the contact structure 300 of the side bezel structure 210 is to be disposed may be processed. The area S may be formed through a separate process of processing the first surface 211 of the support member 230, which is oriented in the first direction (+Z), and the second surface 231 of the support member 230, which is oriented in the third direction (+Y) perpendicular to the first direction (+Z) of the side bezel structure 210.

According to an embodiment, in the primary processing process, a plurality of contact portions 310 that are capable of being exposed to the second surface 211 of the side bezel structure 210 in the area S may be manufactured. Each of the contact portions 310 may be formed by processing at least a portion of the side bezel structure 210 and/or the support member 230 made of the metal material, and may include a second contact surface 312a oriented in the first direction (+Z) and a first contact surface 311a oriented in the third direction (+Y). For example, the first contact surface 311a may be an area that is to come into contact with an external electronic device, and the second contact surface 312a may be an area that is electrically connected to the printed circuit board 240 in the electronic device 101.

According to an embodiment, the primary processing process may include independently cutting each of the plurality of contact portions 310, and may be performed through, for example, a computer numerical control (CNC) processing process.

For example, in order to expose at least a portion of the first contact surface 311a of each of the contact portions 310 towards the third direction (+Y), a tool may be introduced into the peripheral area towards the fourth direction (−Y) opposite the third direction (+Y), and the metal side bezel structure 210 may be cut by the tool. For example, the portion of each first contact surface 311a that is exposed to the outside may have a shape such as a circular shape, and each first contact surface 311a may be manufactured in a cylindrical shape through cutting using the tool.

As another example, in order to expose at least a portion of the second contact surface 312a of each contact portion 310 towards the second direction (−Z), a tool may be introduced into the peripheral area towards the second direction (−Z) so as to cut the metal support member 230. For example, the portion of each second contact surface 312a that is exposed to the outside may have a shape such as a quadrilateral shape, and each second contact surface 312a may be manufactured in a rectangular parallelepiped shape through cutting using the tool.

According to an embodiment, four contact portions 310 are formed in the area S, and may be spaced apart from each other as independently separated structures. However, this disclosure is not limited thereto, and various numbers of contact portions 310 (more than or less than four contact portions 310) may be provided for efficient electrical connection between the electronic device 101 and an external electronic device, and the shape of the contact portions 310 may be variously designed.

Figure 9A:
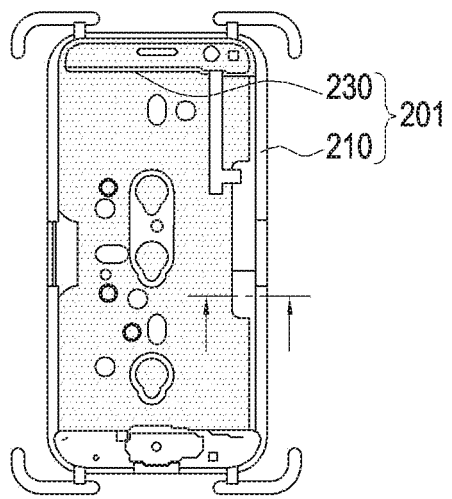
FIG. 9A is a view illustrating the front surface of the housing 201, subjected to an injection-molding process, according to an embodiment of the disclosure.
Figure 9B:
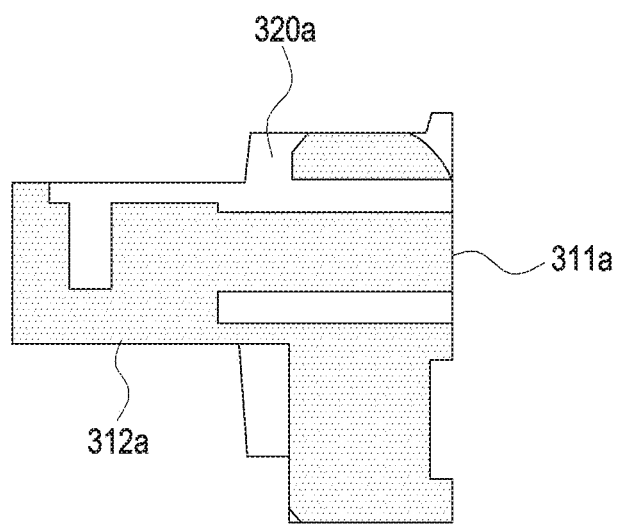
FIG. 9B is a cross-sectional view illustrating an injection-molding process for manufacturing the contact structure 300 according to an embodiment of the disclosure.

FIG. 9A is a view illustrating the front surface of the housing 201, subjected to an injection-molding process, as one of the manufacturing processes of the contact structure 300 according to an embodiment of the disclosure. FIG. 9B is a cross-sectional view illustrating an injection-molding process for manufacturing the contact structure 300, as one of the manufacturing processes of the contact structure 300 according to an embodiment of the disclosure.

Referring to FIGS. 9A and 9B, after the primary processing process of the metal housing 201 made of a metal material, an injection-molding process may be performed. The injection-molding process may be performed as a process of forming a shape that is difficult to implement through computer numerical control (CNC) processing in the final shape of the housing 201 using an injection-molding mold.

According to various embodiments, a recess shape such as a groove is formed in the housing 201 using a tool in the primary processing process, and an area, from which the metal is removed, such as the recess area and the peripheral area therearound, may be filled with an insulating material 320a through the injection-molding process.

According to an embodiment, through the injection-molding process, gaps between the plurality of contact portions 310, formed through the primary processing process, are filled with the insulating material 320a, so that the respective contact portions 310 cannot be brought into contact with each other and thus can be prevented from being electrically connected to each other.

According to an embodiment, through the injection-molding process, the area S may be filled with the insulating material 320a such that the peripheral area around the first contact surface 311a and the second contact surface 312a is surrounded by the insulating material 320a. The insulating material 320a may include a non-conductive material such as a resin (e.g., polycarbonate).

Figure 10A:
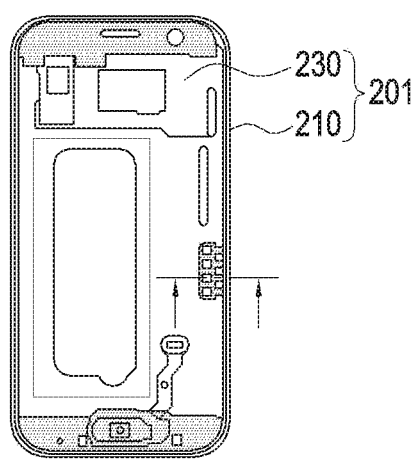
FIG. 10A is a view illustrating the front surface of the housing 201, subjected to the secondary processing process, according to an embodiment of the disclosure.
Figure 10B:
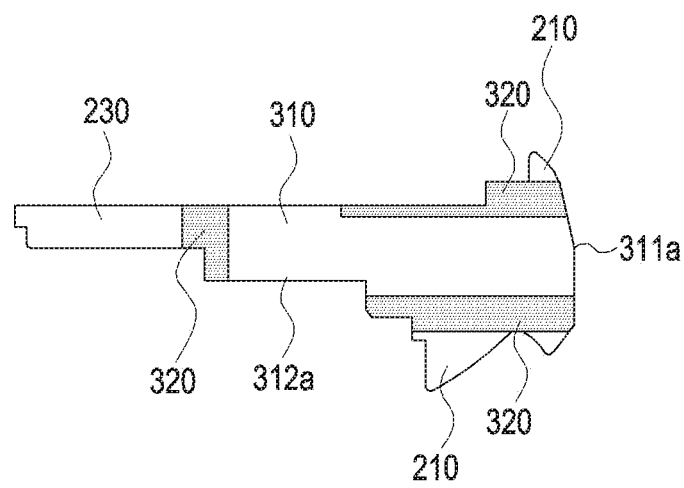
FIG. 10B is a cross-sectional view illustrating the secondary processing process for manufacturing the contact structure 300 according to an embodiment of the disclosure.
Figure 10B:
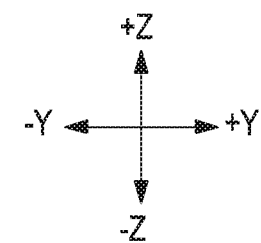

FIG. 10A is a view illustrating the front surface of the housing 201, subjected to the secondary processing process, as one of the manufacturing processes of the contact structure 300 according to an embodiment of the disclosure. FIG. 10B is a cross-sectional view illustrating the secondary processing process for manufacturing the contact structure 300 as one of the manufacturing processes of the contact structure 300 according to an embodiment of the disclosure.

According to various embodiments, after the injection-molding process is completed, the secondary processing process may be performed as a cutting process for the final shape of the housing 201, for example, the external shape of the electronic device.

According to various embodiments, by the processing of the primarily processed area and the injection-molded area of the side bezel structure 210 and the support member 230, the contact structure 300 may include a first contact surface 311a, made of the same material as the side bezel structure 210, which is made of metal, and a second contact surface 312a, made of the same material as the support member 230 extending from the first contact surface 311a into the electronic device. The second contact surface 312a extending into the electronic device may be processed to be connected to the printed circuit board 240 disposed inside the electronic device.

According to an embodiment, through the secondary processing process, the first contact surface 311a of the side bezel structure 210 and the insulating material 320 forming the peripheral area around the first contact surface 311a may be cut into the final shape. The first contact surface 311a may be formed as a circular contact surface oriented in the third direction (+Y), and the insulating material may be formed as a ring structure surrounding the first contact surface 311a. The first contact surface 311a and the remaining area of the side bezel structure 210 may be separated from each other by the insulating material.

According to an embodiment, through the secondary processing process, the second contact surface 312a of the support member 230 and the insulating material 320 forming the peripheral area around the second contact surface 312a may be cut into the final shape. The second contact surface 312a is formed as a quadrangular prism-shaped contact surface oriented in the first direction (+Z), and the insulating material may cover the surface of the first contact surface 311a oriented in the second direction (−Z). The second contact surface 312a and the remaining area of the side bezel structure 210 may be separated from each other by the insulating material.

According to an embodiment, the secondary processing process may include independently cutting each of the plurality of contact portions 310 together with the insulating material, and may be performed through, for example, computer numerical control (CNC) processing.

Figure 11A:
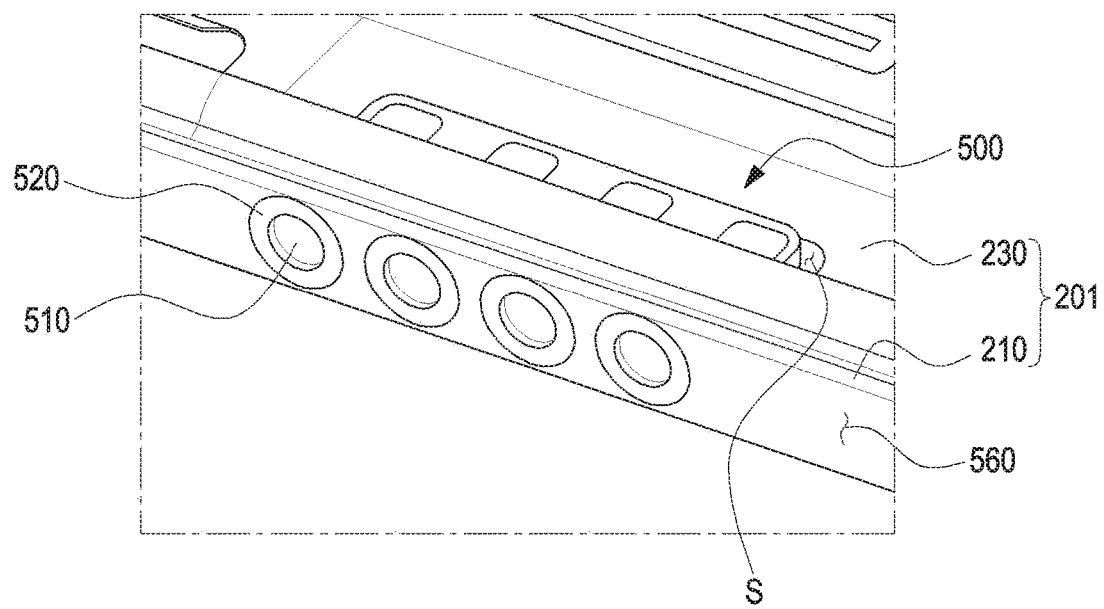
FIG. 11A is a perspective view illustrating one surface of a contact structure 500 formed in the side area of an electronic device according to one of various embodiments of the disclosure.
Figure 11B:
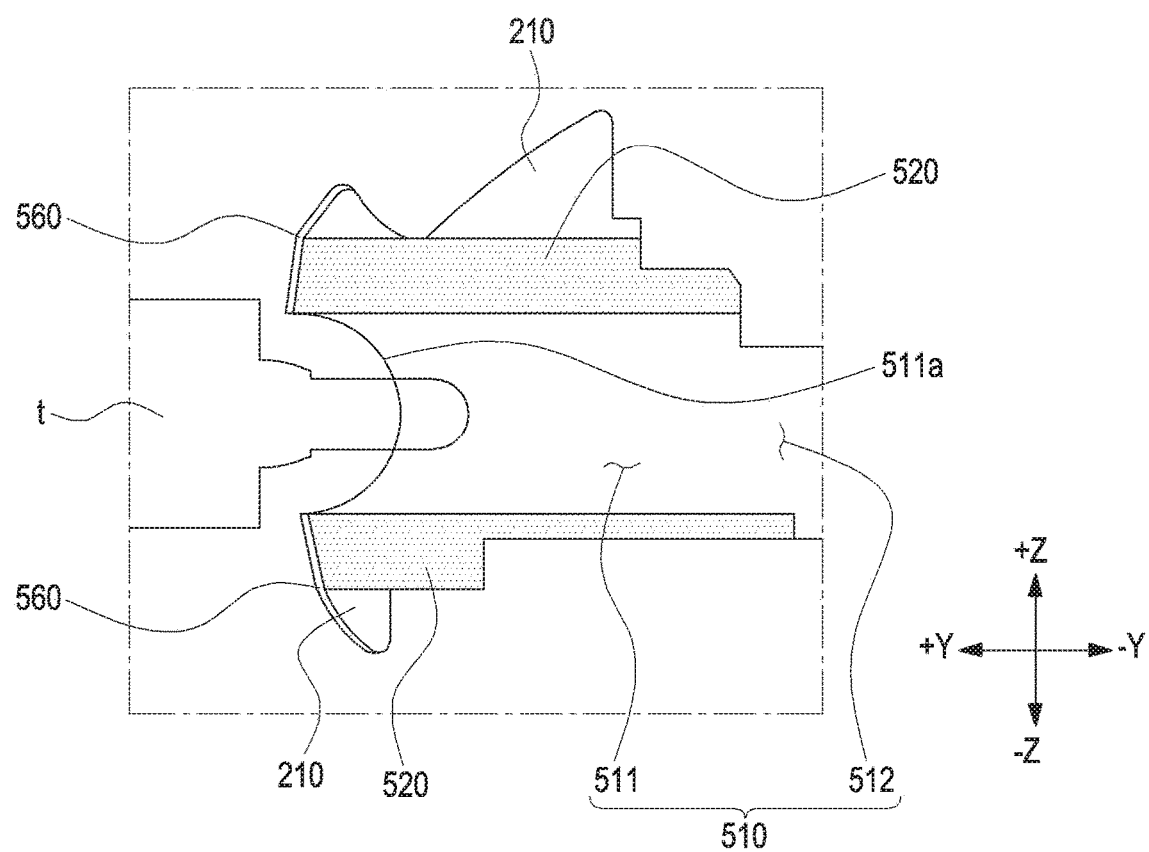
FIG. 11B is a cross-sectional view schematically illustrating a process of cutting one surface of the contact structure 500.

FIG. 11A is a perspective view illustrating one surface of a contact structure 500 formed in the side area of an electronic device according to one of various embodiments of the disclosure, and FIG. 11B is a cross-sectional view schematically illustrating a process of cutting one surface of the contact structure 500.

Referring to FIGS. 11A and 11B, the electronic device according to one of various embodiments of the disclosure may include a housing 201 including a side bezel structure 210 and a support member 230, and the contact structure 500. The housing 201 including the side bezel structure 210 and the support member 230 and the contact structure 500 in FIGS. 11A and 11B may be entirely or partially the same as the housing 201 including the side bezel structure 210 and the support member 230 and the contact structure 300 in FIGS. 3 and 4.

According to various embodiments, the contact structure 500 may be disposed in an area S on the side surface of the housing 201. For example, the contact structure 500 may be disposed over the side bezel structure 210 and at least the area S in the support member 230. According to various embodiments, the contact structure 500 may include at least one contact portion 510 made of the same material as the side bezel structure 210 and/or the support member 230, and an insulating portion 520 disposed in the peripheral portion around the at least one contact portion 510.

According to various embodiments, a plurality of contact structures 500 may be provided, and may form an arrangement in which the contact structures 500 are spaced apart from each other at regular intervals along the longitudinal direction of the electronic device. As another example, at least one coating layer 560 may be formed on the outer surface of the housing 201 (e.g., the outer surface of the side bezel structure 210) around the contact structure 500. For example, the exterior area of the housing 201 of the electronic device 101 exposed to the outside (e.g., the outer surface of the side bezel structure 210) may be manufactured to be wholly wrapped by a coating layer 560 so as to prevent corrosion and/or electric shock.

According to various embodiments, the contact portion 510 of the contact structure 500 may include a first portion 511 manufactured in a shape penetrating the side bezel structure 210 of the housing 201 and a second portion 512 extending from the first portion 511 to the support member 230 of the housing 201. The first portion 511 may include a first contact surface 511a exposed in the third direction (+Y). Since the first contact surface 511a is an area that directly forms an electrical contact point with an external electronic device, electrical connection may not be made when the coating layer 560 is formed thereon. The first contact surface 511a may be formed such that the coating layer 560 is excluded.

For example, in forming the externally exposed structure of the first contact surface 511a of the contact portion 510, the coating layer 560 may be formed on the entire outer surface of the housing 201 other than the first contact surface 511a, or a coating layer 560 may be formed on the entire surface of the housing 201 including the first contact surface 511a, and then the coating layer 560 on the first contact surface 511a may be removed.

Referring back to FIG. 11B, the coating layer 560 may be removed by removing the coating layer 560 only from the first contact surface 511a or forming a groove to a predetermined depth using the external tool t. When the first contact surface 511a including the groove having the predetermined depth is in contact with an external device, the contact area can be enlarged, thereby improving the stability of electrical coupling. As another example, an anti-corrosion structure for the first contact surface 511a may be implemented by adding the above-described structure (a structure for sensing foreign matter in FIGS. 6 and 7).

Figure 12A:
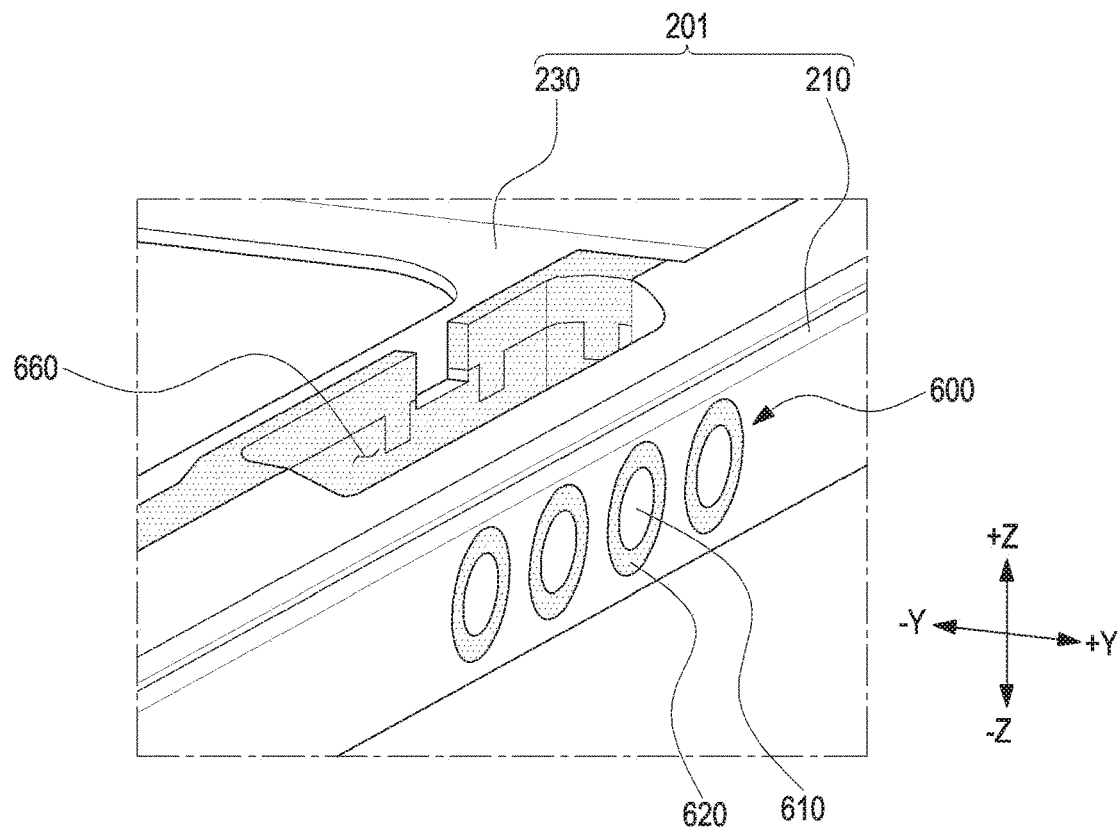
FIG. 12A is a perspective view illustrating one surface of a contact structure 600 formed in the side area of an electronic device according to one of various embodiments of the disclosure.
Figure 12B:
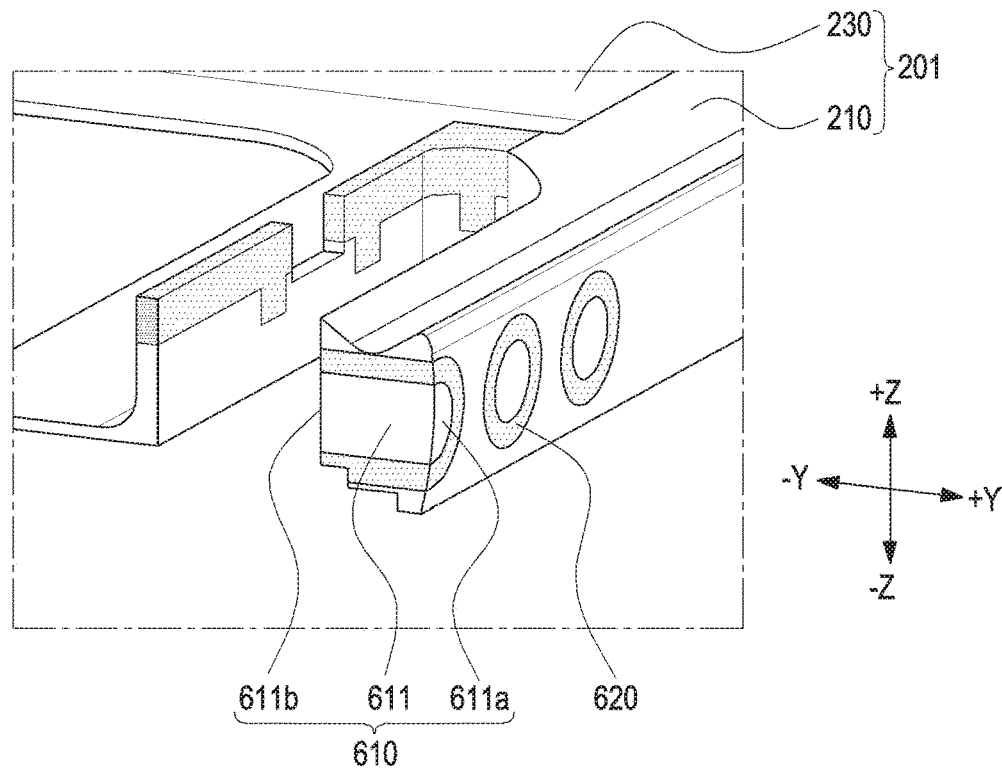
FIG. 12B is a perspective view obtained by cutting one side of the contact structure 600 of FIG. 12A.

FIG. 12A is a perspective view illustrating one surface of a contact structure 600 formed in the side area of an electronic device according to one of various embodiments of the disclosure, and FIG. 12B is a perspective view obtained by cutting one side of the contact structure 600 of FIG. 12A.

Referring to FIGS. 12A and 12B, the electronic device according to one of various embodiments of the disclosure may include a housing 201 including a side bezel structure 210 and a support member 230, and the contact structure 600. The housing 201 including the side bezel structure 210 and the support member 230 and the contact structure 600 in FIGS. 12A and 12B may be entirely or partially the same as the housing 201 including the side bezel structure 210 and the support member 230 and the contact structure 300 in FIGS. 3 and 4. Hereinafter, the differences from the structure of FIGS. 3 and 4 will be mainly described.

According to various embodiments, the contact structure 600 may be disposed in an area of the side surface of the housing 201. For example, the contact structure 600 may be disposed over the side bezel structure 210 and at least the area in the support member 230. According to various embodiments, the contact structure 600 may include at least one contact portion 610 made of the same material as the side bezel structure 210 and/or the support member 230, and an insulating portion 620 disposed in the peripheral portion around the at least one contact portion 610.

According to various embodiments, a plurality of contact structures 600 may be provided, and may form an arrangement in which the contact structures 600 are spaced apart at regular intervals along the longitudinal direction of the electronic device.

According to various embodiments, the contact portion 610 of the contact structure 600 may include a first portion 611 manufactured in a shape penetrating the side bezel structure 210 of the housing 201. A slit portion 660 may be included between the first portion 611 of the contact portion 610 and the support member 230 of the housing 201. The first portion 611 may include a first contact surface 611a exposed in the third direction (+Y) and a second contact surface 611b oriented in the fourth direction (−Y) to face the inside of the electronic device. The first contact surface 611a may be formed as a flat or partially curved surface in order to form a contact point with an external electronic device or the like. The first portion 611 may be coupled to an insulating portion 620 formed through insert injection molding, and the insulating portion 620 may be disposed to surround an area other than the first contact surface 611a and the second contact surface 611b of the first portion 611.

According to various embodiments, the slit portion 660 in the contact structure 600 may be a space opened to expose the second contact surface 611b inside the electronic device, and may provide a space in which the second contact surface 611b is capable of directly forming a contact point with a printed circuit board. The printed circuit board may be a flexible printed circuit board, and may be connected to a printed circuit board (e.g., the printed circuit board 240 in FIG. 2) of the electronic device 101. With the contact structure 600 according to the above-described embodiment, the metal area of the first portion 661 does not extend to the inside of the support member 230. Thus, it is possible to reduce the areas manufactured through a cutting (e.g., computer numerical control (CNC) processing) process and an injection-molding process, thereby achieving a cost- and time-saving effect.

Figure 13A:
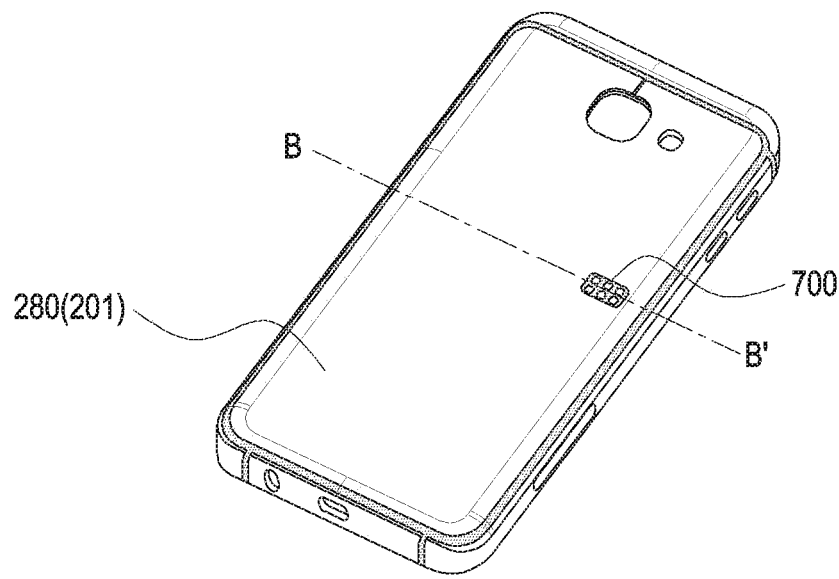
FIG. 13A is a perspective view illustrating one surface of a contact structure 700 formed in the rear side area of an electronic device according to one of various embodiments of the disclosure.
Figure 13B:
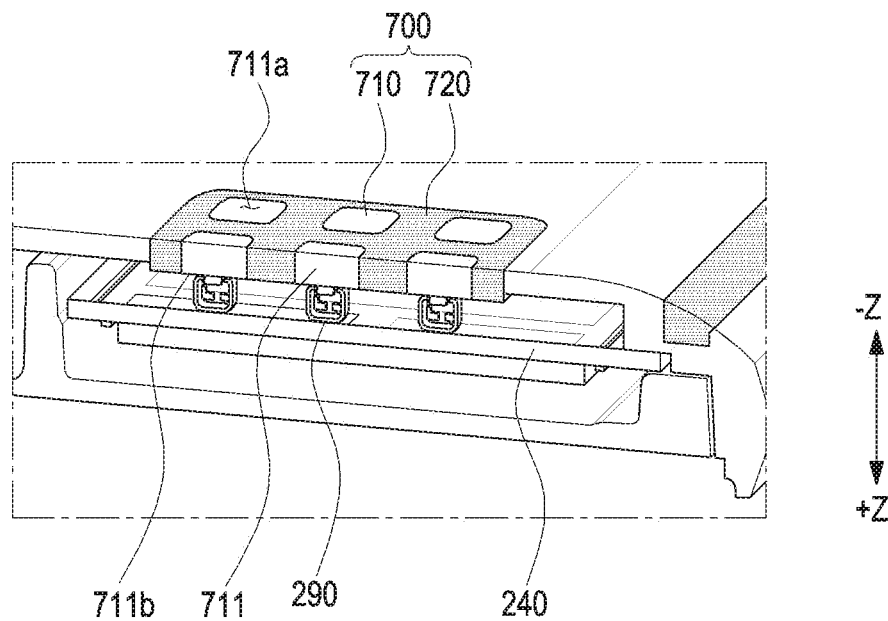
FIG. 13B is a cross-sectional view of the contact structure 700 of FIG. 13A taken along line B-B'.

FIG. 13A is a perspective view illustrating one surface of a contact structure 700 formed in the rear side area of an electronic device according to one of various embodiments of the disclosure, and FIG. 13B is a cross-sectional view of the contact structure 700 of FIG. 13A taken along line B-B'.

Referring to FIGS. 13A and 13B, the electronic device 101 according to one of various embodiments of the disclosure may include a housing 201 including a rear cover 280, and the contact structure 700. The housing 201 including the rear cover 280 and the contact structure 700 in FIGS. 13A and 13B may be entirely or partially the same as the housing 201 including the rear cover 280 and the contact structure 300 in FIG. 2.

According to various embodiments, the contact structure 700 may be formed in an area of the rear cover 280 of the housing 201. The contact structure 700 may include at least one contact portion 710 made of the same material as the rear cover 280, and an insulating portion 720 disposed in the peripheral portion around the at least one contact portion 710. For example, the rear cover 280 and the contact structure 710 may be made of a metal material. According to various embodiments, a plurality of contact structures 700 may be provided, and may form an arrangement in which the contact structures 700 are spaced apart from each other at regular intervals along the longitudinal direction and/or the width direction of the electronic device.

According to various embodiments, the contact portion 710 of the contact structure 700 may include a first portion 711 manufactured in a shape penetrating the rear cover 280 (e.g., the rear cover 280 in FIG. 2) disposed on the rear surface of the electronic device 101. The first portion 711 may include a first contact surface 711*a* exposed in the second direction (−Z) and a second contact surface 711*b* oriented in the first direction (+Z) to face the inside of the electronic device. The first contact surface 711*a* may be formed as a flat or partially curved surface in order to form a contact point with an external electronic device or the like. The first portion 711 may be coupled to an insulating portion 720 formed through insert injection molding, and the insulating portion 720 may be disposed to surround an area other than the first contact surface 711*a* and the second contact surface 711*b* of the first portion 711.

According to various embodiments, the electronic device 101 may include a contact point structure 290, which is in contact with the second contact surface 711*b*, and a printed circuit board 240. The contact point structure 290 is disposed between the second contact surface 711*b* and the printed circuit board 240, and may transfer, to the printed circuit board 240, the current provided from the first contact surface 711*a* of the contact structure 700 to the second contact surface 711*b*.

Figure 14A:
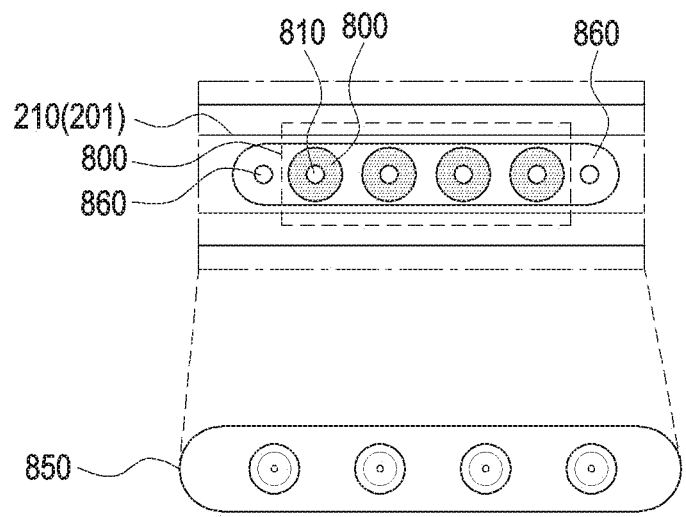
FIG. 14A is a perspective view illustrating a contact structure 800 disposed in a side area of an electronic device according to one of various embodiments of the disclosure and a cover 850 that covers the contact structure 800.
Figure 14B:
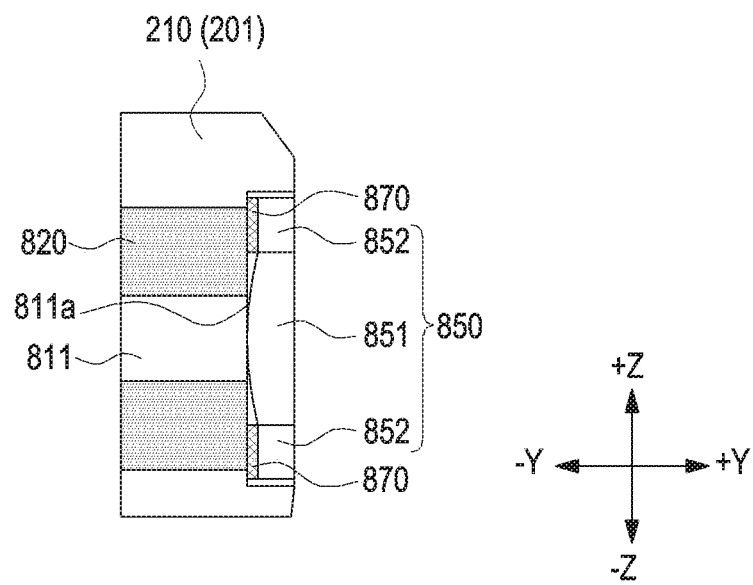
FIG. 14B is a cross-sectional view obtained by cutting one side of the contact structure 800 and the cover 850 in FIG. 14A.

FIG. 14A is a perspective view illustrating a contact structure 800 disposed in a side area of an electronic device according to one of various embodiments of the disclosure and a cover 850 that covers the contact structure 800, and FIG. 14B is a cross-sectional view obtained by cutting one side of the contact structure 800 and the cover 850 in FIG. 14A.

Referring to FIGS. 14A and 14B, the electronic device according to one of various embodiments of the disclosure may include a housing 201 including a side bezel structure 210 and a support member (e.g., the support member 230 in FIG. 2), the contact structure 800, and the cover 850. The housing 201 including the side bezel structure 210 and the support member 230 and the contact structure 800 in FIGS. 14A and 14B may be entirely or partially the same as the housing 201 including the side bezel structure 210 and the support member 230 and the contact structure 300 in FIGS. 3 and 4.

According to various embodiments, the contact structure 800 may be disposed in an area of the side surface of the housing 201. For example, the contact structure 800 may be disposed over the side bezel structure 210 and at least the area in the support member. According to various embodiments, the contact structure 800 may include at least one contact portion 810 made of the same material as the side bezel structure 210 and/or the support member 230, and an insulating portion 820 disposed in the peripheral portion around the at least one contact portion 810.

According to various embodiments, a plurality of contact structures 800 may be provided, and may form an arrangement in which the contact structures 800 are spaced apart from each other at regular intervals along the longitudinal direction of the electronic device. As another example, the outer surface of the contact structure 800 may include a cover 850. For example, the cover 850 prevents corrosion and/or electric shocks that may occur in the outer surface area of the contact structure 800 including the first contact surface 811*a* exposed to the outside, and may provide smooth energization.

According to various embodiments, the contact portion 810 of the contact structure 800 may include a first portion 811 penetrating the side bezel structure 210 of the housing 201 and a second portion 312 (e.g., the second portion 312 in FIG. 3) extending from the first portion 811 to the support member 230 of the housing 201. The first portion 811 may include a first contact surface 811*a* exposed in the third direction (+Y). Magnets 860 may be disposed at opposite ends of the contact structure 800 in order to increase adhesion when an external electronic device is connected thereto.

According to various embodiments, the first contact surface 811*a* is an area that directly forms an electrical contact point with an external electronic device, and thus electrical connection is not achieved when a coating layer is formed thereon. Thus, the first contact surface 811*a* may be formed such that the coating layer is excluded therefrom. For example, in forming the externally exposed structure of the first contact surface 811*a* of the contact portion 810, the coating layer may be formed on the outer surface of the housing 201 other than the first contact surface 811*a*, or a coating layer may be formed on the entire surface of the housing 201 including the first contact surface 811*a* and then the coating layer on the first contact surface 811*a* may be removed. According to an embodiment, in order to enable the electronic device to be electrically connected to an external electronic device, and to prevent corrosion of a portion from which the coating layer is removed, a cover 850 to which a separate corrosion protection measure is applied may be disposed.

According to various embodiments, the cover 850 may include a conductive portion 851 disposed in the area corresponding to the first contact surface 811a of the first portion 811 and an insulating portion 852 formed to surround the conductive portion 851. The conductive portion 851 may be formed to correspond to the number of first contact surfaces 811a, and may provide a terminal function to electrically connect an external electronic device and the contact structure 800 to each other. As another example, the radius of the conductive portion 851 may be larger than the radius of the first contact surface 811a, and in order to facilitate connection of a terminal contact point with the first contact surface 811a, the conductive portion 851 may be made of an elastic material in an embossed shape.

According to various embodiments, an adhesive member 870 may be disposed between the cover 850 and the contact structure 800 so as to bond the cover 850 and the contact structure 800 to each other. The adhesive member 870 may include, for example, double-sided tape, and can prevent foreign matter such as moisture from entering the contact structure 800 inside the cover 850.

Figure 15A:
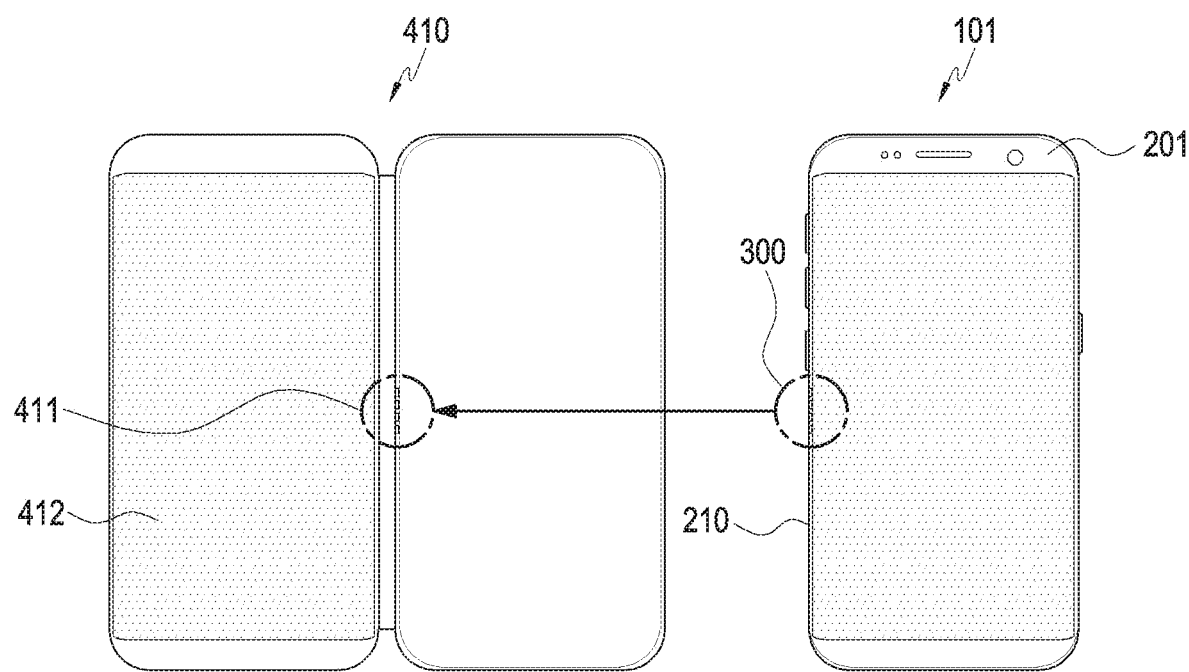
FIGS. 15A and 15B are schematic views illustrating a connection for data communication between the electronic device 101 and an external electronic device 410 according to one of various embodiments of the disclosure.
Figure 15B:
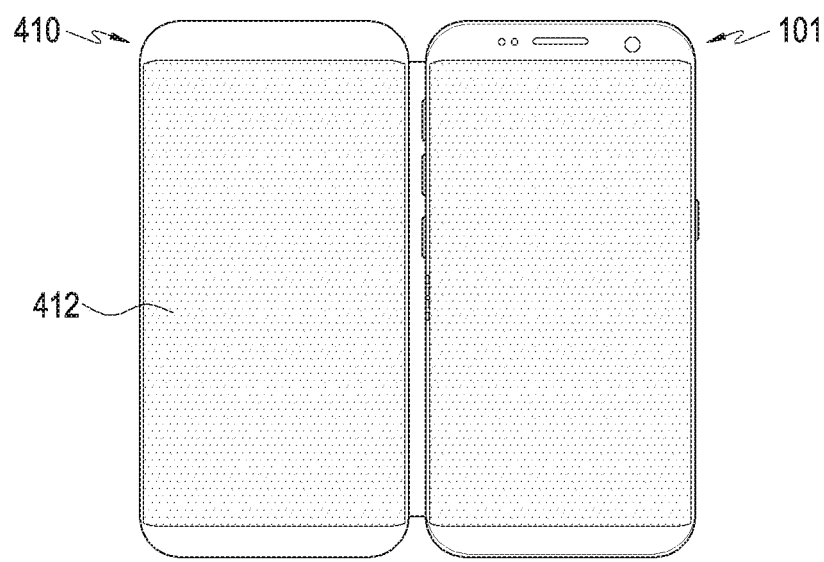

FIGS. 15A and 15B are schematic views illustrating a connection for data communication between the electronic device 101 and an external electronic device 410 according to one of various embodiments of the disclosure. FIG. 15A is a view illustrating the separated state between the electronic device 101 and the external electronic device 410, and FIG. 15B is a view illustrating the coupled state between the electronic device 101 and the external electronic device 410.

Referring to FIGS. 15A and 15B, the electronic device 101 according to one of various embodiments of the disclosure may include a contact structure 300 on the outer surface of a housing 201. The description of the contact structure 300 in FIGS. 3 and 4 applies, mutatis mutandis, to the contact structure 300 in FIGS. 15A and 15B.

According to various embodiments, the contact structure 300 may be disposed in an area of the side surface of the housing 201. According to various embodiments, the contact structure 300 may include at least one contact portion made of the same material as the side bezel structure 210 of the housing 201 (e.g., a metal material).

According to various embodiments, the contact portion of the contact structure 300 may be implemented through cutting (e.g., computer numerical control (CNC) processing) and insert injection molding of a portion of the housing 201. A plurality of contact structures 300 may be provided, and may form an arrangement in which the contact structures 300 are spaced apart from each other at regular intervals along the longitudinal direction of the electronic device.

According to various embodiments, the contact structure 300 may include four contact portions according to Table 1 described above. The contact portions exposed to the outside of the electronic device 101 may be, for example, a VCC line, a data line, a sensing line, and/or a ground. Among the contact portions, the VCC line and the ground may be provided as a power line for receiving power from the outside or supplying power to an external device, and among the contact portions, the data line may be provided as a line for transmitting data between the electronic device and the external device 410. Among the contact portions, the sensing line may sense foreign matter from the outside, such as moisture that comes into contact therewith.

According to an embodiment, the external electronic device 410 (e.g., an accessory device) capable of forming a contact point with the contact structure 300 of the electronic device may include a contact point structure 411 in an area corresponding to the contact structure 300. For example, the external electronic device 410 may be a flip-shaped case cover that covers the electronic device 101. The external electronic device 410 may include a display device 412 therein, and when the contact point structure 411 of the external electronic device 410 and the contact structure 300 of the electronic device 101 are connected to each other, the display device 412 may receive power from the electronic device. As another example, the electronic device 101 may control the power of the display device 412 of the external electronic device 410, and may transmit data to be displayed on the display device 412 using the data line among the contact portions.

Figure 16A:
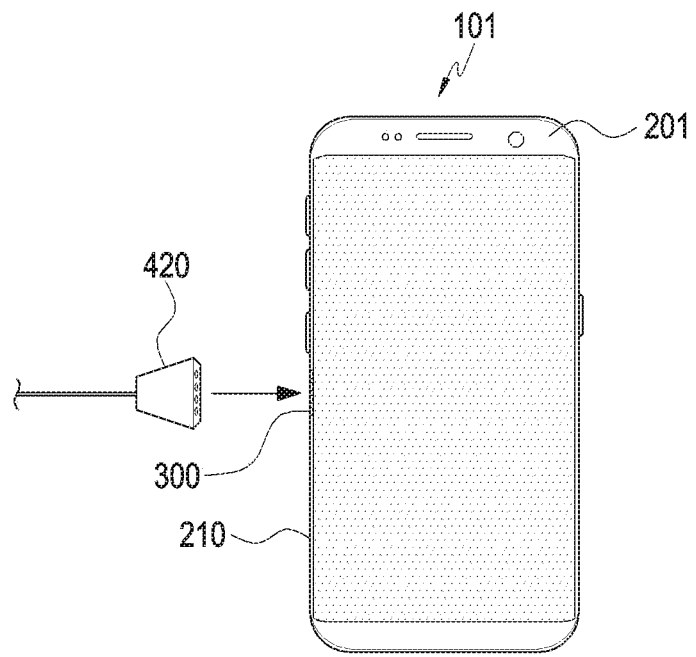
FIGS. 16A and 16B are schematic views illustrating a connection for data communication between the electronic device 101 and an external electronic device 420 according to one of various embodiments of the disclosure.
Figure 16B:
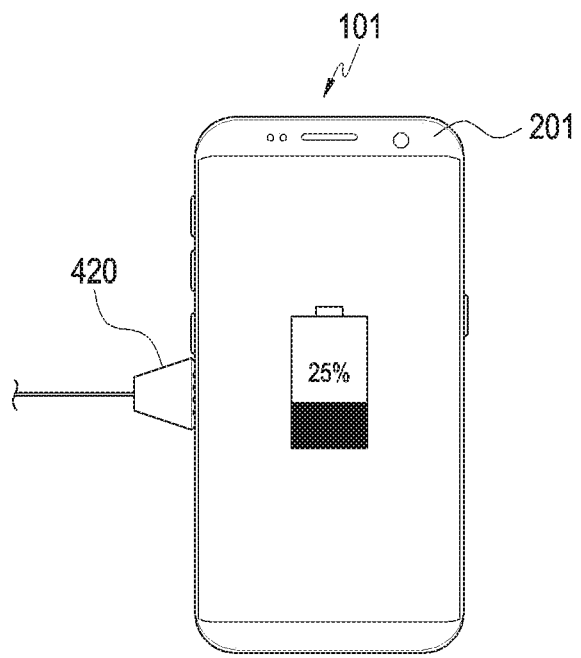

FIGS. 16A and 16B are schematic views illustrating a connection for data communication between the electronic device 101 and an external electronic device 420 according to one of various embodiments of the disclosure. FIG. 16A is a view illustrating the separated state between the electronic device 101 and the external electronic device 420, and FIG. 16B is a view illustrating the coupled state between the electronic device 101 and the external electronic device 420.

Referring to FIGS. 16A and 16B, the electronic device 101 according to one of various embodiments of the disclosure may include a contact structure 300 on the outer surface of a housing 201. The description of the contact structure 300 in FIGS. 3 and 4 applies, mutatis mutandis, to the contact structure 300 in FIGS. 16A and 16B.

According to various embodiments, the contact structure 300 may be disposed in an area of the side surface of the housing 201. According to various embodiments, the contact structure 300 may include at least one contact portion made of the same material as the side bezel structure 210 (e.g., a metal material).

According to various embodiments, the contact portion of the contact structure 300 may be implemented through cutting (e.g., computer numerical control (CNC) processing) and insert injection molding of a portion of the housing 201. A plurality of contact structures 300 may be provided, and may form an arrangement in which the contact structures 300 are spaced apart from each other at regular intervals along the longitudinal direction of the electronic device.

According to various embodiments, the contact structure 300 may include four contact portions according to Table 1 described above. The contact portions exposed to the outside of the electronic device 101 may be, for example, a VCC line, a data line, a sensing line, and/or a ground. Among the contact portions, the VCC line and the ground may be provided as power lines for receiving power from the outside or supplying power to an external device, and among the contact portions, the data line may be provided as a line for transmitting data between the electronic device and the external device 420. Among the contact portions, the sensing line may sense foreign matter from the outside. such as moisture that comes into contact therewith.

According to an embodiment, the external electronic device 420 (e.g., a power supply) capable of forming a contact point with the contact structure 300 of the electronic device may include a contact point structure in an area corresponding to the contact structure 300. For example, in the electronic device 101, a separate power supply terminal (e.g., a USB terminal) may be excluded, and power may be supplied through contact-point connection between the external power supply and the contact structure 300.

Figure 17A:
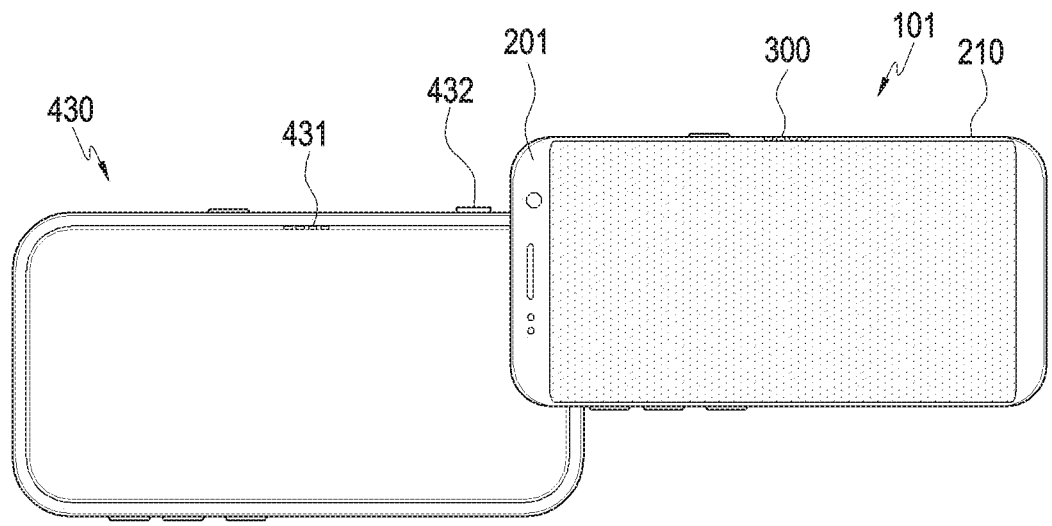
FIGS. 17A and 17B are schematic views illustrating a connection for data communication between the electronic device 101 and an external electronic device 430 according to one of various embodiments of the disclosure.
Figure 17B:
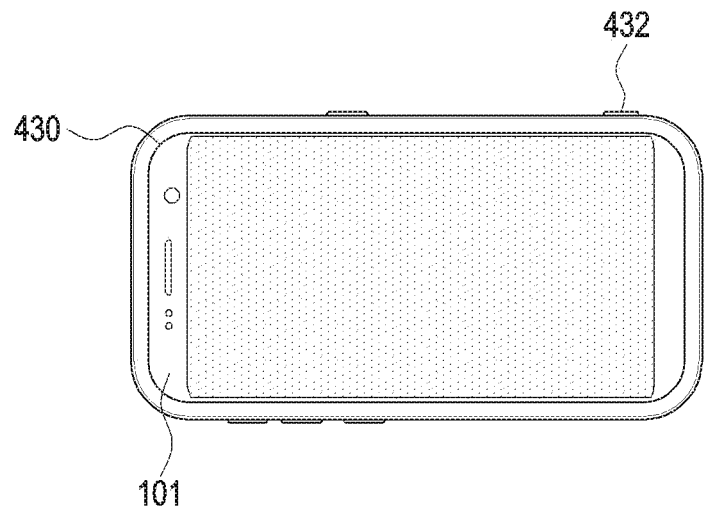

FIGS. 17A and 17B are schematic views illustrating a connection for data communication between the electronic device 101 and an external electronic device 430 according to one of various embodiments of the disclosure. FIG. 17A is a view illustrating the separated state between the electronic device 101 and the external electronic device 430, and FIG. 17B is a view illustrating the coupled state between the electronic device 101 and the external electronic device 430.

Referring to FIGS. 17A and 17B, the electronic device 101 according to one of various embodiments of the disclosure may include a contact structure 300 on the outer surface of a housing 201. The description of the contact structure 300 in FIGS. 3 and 4 applies, mutatis mutandis, to the contact structure 300 in FIGS. 17A and 17B.

According to various embodiments, the contact structure 300 may be disposed in an area of the side surface of the housing 201. According to various embodiments, the contact structure 300 may include at least one contact portion made of the same material as the side bezel structure 210 (e.g., a metal material).

According to various embodiments, the contact portion of the contact structure 300 may be implemented through cutting (e.g., computer numerical control (CNC) processing) and insert injection molding of a portion of the housing 201. A plurality of contact structures 300 may be provided, and may form an arrangement in which the contact structures 300 are spaced apart from each other at regular intervals along the longitudinal direction of the electronic device.

According to various embodiments, the contact structure 300 may include four contact portions according to [Table 1] described above. The contact portions exposed to the outside of the electronic device 101 may be, for example, a VCC line, a data line, a sensing line, and/or a ground. Among the contact portions, the VCC line and the ground may be provided as power lines for receiving power from the outside or supplying power to an external device, and among the contact portions, the data line may be provided as a line for transmitting data between the electronic device and the external device 430. Among the contact portions, the sensing line may sense foreign matter from the outside such as moisture that comes into contact therewith.

According to an embodiment, the external electronic device 430 (e.g., an accessory device) capable of forming a contact point with the contact structure 300 of the electronic device may include a contact point structure in an area corresponding to the contact structure 300. For example, the external electronic device 430 may be a case that covers the electronic device 101. The external electronic device 430 may include a dedicated key 432, and the dedicated key 432 may perform an operation that cannot be performed by the electronic device. For example, the external electronic device 430 may include a camera-dedicated key. After the contact point structure 431 of the external electronic device 430 and the contact structure 300 of the electronic device 101 are connected to each other, the camera-dedicated key may identify the external accessory device using the sensing (ID) line among the contact portions, and may perform an operation corresponding thereto using the data line.

An electronic device (e.g., the electronic device 101 in FIG. 2) according to various embodiments of the disclosure may include:

a housing (e.g., the housing 210 in FIG. 2) including a first plate that is oriented in a first direction, a second plate that is oriented in a second direction opposite the first direction, and a side member that surrounds a space between the first and second plates; a printed circuit board (e.g., the printed circuit board 240 in FIG. 2) disposed in the space of the housing; a contact structure (e.g., the contact structure 300 in FIG. 2) formed by being processed to face at least one surface of the printed circuit board from the side member of the housing, the contact structure being configured to provide a contact point with an external electronic device; and a contact point structure (e.g., the contact point structure 290 in FIG. 6) disposed between the contact structure and the printed circuit board. The contact structure may include: at least one contact portion (e.g., the contact portion 310 in FIG. 5) which is at least partially exposed to an external space and is made of the same material as the side member; and an insulating portion (e.g., the insulating portion 320 in FIG. 5) disposed around the at least one contact portion so as to space the contact portion and the side member apart from each other.

According to various embodiments, the at least one contact portion may be formed through cutting of at least a portion of the side member, and may be made of the same metal material as the side member.

According to various embodiments, the insulating portion may be formed in at least a portion of the side member through insert injection molding and cutting, and may be made of a material different from that of the contact portion.

According to various embodiments, the side member may include a side bezel structure (the side bezel structure 210 in FIG. 5) configured to cover the outer surface of the electronic device, and a support member (e.g., the support member 230 in FIG. 5) extending from the side bezel structure and formed inside the electronic device so as to support electronic components. The contact portion may include: a first portion (the first portion 311 in FIG. 5) formed in a shape penetrating at least a portion of the side bezel structure; and a second portion (the second portion 312 in FIG. 5) extending from the first portion to be formed up to an area adjacent to the support member.

According to various embodiments, the first portion of the contact portion may include a first contact surface (the first contact surface 311a in FIG. 5) exposed to the outside of the electronic device, the second portion of the contact portion may include a second contact surface (the second contact surface 312a in FIG. 5) oriented in the second direction inside the electronic device, and the second contact surface may be disposed to come into contact with the contact point structure.

According to various embodiments, the direction in which the first contact surface is oriented and the direction in which the second contact surface is oriented may be perpendicular to each other.

According to various embodiments, the insulating portion (the insulating portion 320 in FIG. 5) may include: a first insulating portion (the first insulating portion in FIG. 5) formed to wrap at least a portion of the first portion of the contact portion; and a second insulating portion (the second insulating portion 322 in FIG. 5) disposed between the second portion of the contact portion and the support member so as to prevent the second portion and the support member from coming into contact with each other.

According to various embodiments, the electronic device may further include at least one magnet (the magnet 350 in FIG. 7) disposed at at least one end of the contact structure to be spaced apart from the contact portion and configured to provide an adhesive force for adhesion to an external electronic device.

According to various embodiments, a plurality of contact portions may be provided, and may form an arrangement in which the contact portions are spaced apart from each other at predetermined intervals along the longitudinal direction of the electronic device, and the plurality of contact portions may include a first contact portion (the first contact portion 310a in FIG. 7) including a VCC line, a second contact portion (the second contact portion 310b in FIG. 7) including a data line, a third contact portion (the third contact portion 310c in FIG. 7) including a sensing line, and/or a fourth contact portion (the fourth contact portion 310d in FIG. 4) forming a ground.

According to various embodiments, the electronic device may further include a coating layer (the coating layer 560 in FIG. 11B) formed on the outer surface of the side bezel structure, wherein the coating layer may be formed in an area other than the area in which the at least one contact portion is disposed.

According to various embodiments, the first portion of the contact portion may include a first contact surface exposed to the outside of the electronic device, the second portion of the contact portion may include a second contact surface oriented in the second direction inside the electronic device and disposed to be in contact with the contact point structure, and the first contact surface may include a groove having a predetermined depth therein, and at least a portion of the groove forms a curved surface.

According to various embodiments, the side member may include a side bezel structure configured to cover the outer surface of the electronic device, and a support member extending from the side bezel structure and formed inside the electronic device so as to support electronic components, and the contact portion may include one portion formed in a shape penetrating at least a portion of the side bezel structure. The side member may include a slit portion formed between the one portion and the support member, and a flexible printed circuit board forming a contact point with the one portion may be disposed inside the slit portion.

According to various embodiments, the electronic device may further include a cover (the cover 850 in FIG. 14A) disposed on an outer surface of the contact structure and configured to prevent corrosion of the first contact surface, wherein the cover may include a conductive portion (the conductive portion 851 in FIG. 14B) disposed in an area of the first portion that corresponds to the first contact surface, and an insulating portion (the insulating portion in FIG. 14B) formed to wrap at least a portion of the conductive portion.

According to various embodiments, the conductive portion of the cover may be formed to have a radius larger than the radius of the first contact surface, and may include therein an embossed shape for strengthening a contact point with the first contact surface.

According to various embodiments, an adhesive member (the adhesive member 870 in FIG. 14B) may be disposed between the insulating portion of the contact structure and an insulating portion of the cover.

An electronic device (the electronic device 101 in FIG. 2) according to various embodiments may include:
a housing (the housing 201 in FIG. 2) including a front plate, a rear plate facing a direction opposite the direction faced by the front plate, and a side member surrounding a space between the front plate and the rear plate, wherein the side member is integrally formed with the rear plate or is disposed to be in contact with the rear plate, is formed of a first conductive material, and includes a plurality of through holes formed so as to be aligned along one portion of the side member; an electrical connector (the contact structure 300 in FIG. 2) including a plurality of conductive pins (the contact portions 310 in FIG. 5), each of which is at least partially disposed in one of the through holes and is formed of the first conductive material, and a plurality of insulating structures (the insulating portions 320 in FIG. 5) at least partially inserted into the through holes in order to electrically insulate the conductive pins from the side member; a printed circuit board (the printed circuit board 240 in FIG. 2) positioned inside the space; an electronic component mounted on the printed circuit board; and at least one conductive path (the contact structure 290 in FIG. 6) disposed between the electronic component and the conductive pins.

According to various embodiments, the first conductive material may include aluminum.

According to various embodiments, the side member may include an outer surface exposed to the outside of the electronic device and an anodized layer on the outer surface.

According to various embodiments, the conductive pins may include outer surfaces exposed to the outside of the electronic device without an anodized layer.

According to various embodiments, the electronic device may further include at least one magnetic element (the magnet 350 in FIG. 7) within the side member adjacent to the one portion of the side member.

According to various embodiments, the conductive path may include a flexible conductive member configured to come into contact with the printed circuit board.

According to various embodiments, the electronic device may further include an application processor positioned within the space, and operably connected to a middle plate oriented in a direction parallel to the printed circuit board and the conductive pins, wherein the middle plate may be formed of the first conductive material and may be structurally connected to the conductive pins.

It will be apparent to a person ordinarily skilled in the technical field to which the disclosure belongs that the above-mentioned electronic device according to various embodiments is not limited by the above-mentioned embodiments and drawings, and may be variously substituted, modified, and changed within the technical scope of the disclosure.

The invention claimed is:
1. An electronic device comprising:
a housing including a first plate, a second plate opposing the first plate, and a side member that surrounds a space between the first and second plates;
a printed circuit board disposed in the space of the housing;
a contact structure formed by being processed to face at least one surface of the printed circuit board from the side member of the housing, the contact structure being configured to provide a contact point with an external electronic device; and
a contact point structure disposed between the contact structure and the printed circuit board to provide an electrical contact point between the contact structure and the printed circuit board,
wherein the contact structure includes:
at least one contact portion which is at least partially exposed to an external space and is made of a same material as the side member, and
an insulating portion disposed around the at least one contact portion so as to space the contact portion and the side member apart from each other, and
wherein at least a portion of the contact point structure includes a flexible portion formed to be elastically movable.
2. The electronic device of claim 1, wherein the at least one contact portion is formed through cutting of at least a portion of the side member and is made of a same metal material as the side member.
3. The electronic device of claim 2, wherein the insulating portion is formed in at least a portion of the side member through insert injection molding and the cutting, and is made of a material different from a material of the contact portion.

4. The electronic device of claim 3,
wherein the side member includes a side bezel structure configured to cover an outer surface of the electronic device, and a support member extending from the side bezel structure and formed inside the electronic device so as to support electronic components, and
wherein the contact portion includes:
a first portion formed in a shape penetrating at least a portion of the side bezel structure, and
a second portion extending from the first portion to be formed up to an area adjacent to the support member.

5. The electronic device of claim 4,
wherein the first portion of the contact portion includes a first contact surface exposed to an outside of the electronic device,
wherein the second portion of the contact portion includes a second contact surface facing the second plate inside the electronic device, and the second contact surface is disposed to come into contact with the contact point structure, and a direction in which the first contact surface is oriented and a direction in which the second contact surface is oriented are perpendicular to each other, and
wherein the insulating portion includes:
a first insulating portion formed to wrap at least a portion of the first portion of the contact portion, and
a second insulating portion disposed between the second portion of the contact portion and the support member so as to prevent the second portion and the support member from coming into contact with each other.

6. The electronic device of claim 5, further comprising:
a cover disposed on an outer surface of the contact structure and configured to prevent corrosion of the first contact surface,
wherein the cover includes:
a conductive portion disposed in an area of the first portion that corresponds to the first contact surface, and
an insulating portion formed to wrap at least a portion of the conductive portion,
wherein the conductive portion of the cover is formed to have a radius larger than a radius of the first contact surface, and includes therein an embossed shape for strengthening a contact point with the first contact surface, and
wherein an adhesive member is disposed between the insulating portion of the contact structure and the insulating portion of the cover.

7. The electronic device of claim 4, further comprising:
a coating layer formed on an outer surface of the side bezel structure,
wherein the coating layer is formed in an area other than an area in which the at least one contact portion is disposed.

8. The electronic device of claim 4,
wherein the first portion of the contact portion includes a first contact surface exposed to an outside of the electronic device, and the second portion of the contact portion includes a second contact surface facing the second plate inside the electronic device and disposed to be in contact with the contact point structure, and
wherein the first contact surface includes a groove having a predetermined depth therein, and at least a portion of the groove forms a curved surface.

9. The electronic device of claim 3, further comprising:
at least one magnet disposed at at least one end of the contact structure to be spaced apart from the contact portion and configured to provide an adhesive force with an external electronic device,
wherein a plurality of contact portions are provided and form an arrangement in which the contact portions are spaced apart from each other at predetermined intervals along a longitudinal direction of the electronic device, and
wherein the plurality of contact portions include a first contact portion including a voltage common collector (VCC) line, a second contact portion including a data line, a third contact portion including a sensing line, and/or a fourth contact portion forming ground.

10. The electronic device of claim 3,
wherein the side member includes a side bezel structure configured to cover an outer surface of the electronic device, and a support member extending from the side bezel structure and formed inside the electronic device so as to support electronic components,
wherein the contact portion includes one portion formed in a shape penetrating at least a portion of the side bezel structure, and
wherein the side member includes a slit portion formed between the one portion and the support member, and a flexible printed circuit board forming a contact point with the one portion is disposed inside the slit portion.

11. An electronic device comprising:
a housing including a front plate, a rear plate facing a direction opposite a direction faced by the front plate, and a side member surrounding a space between the front plate and the rear plate, wherein the side member is integrally formed with the rear plate or is disposed to be in contact with the rear plate, is formed of a first conductive material, and includes a plurality of through holes formed so as to be aligned along one portion of the side member;
an electrical connector including a plurality of conductive pins, each of which is at least partially disposed in one of the plurality of through holes and is formed of the first conductive material, and a plurality of insulating structures at least partially inserted into the plurality of through holes in order to electrically insulate the conductive pins from the side member;
a printed circuit board positioned inside the space;
an electronic component mounted on the printed circuit board; and
at least one conductive path disposed between the electronic component and the conductive pins,
wherein at least a portion of the at least one conductive path includes a flexible portion formed to be elastically movable.

12. The electronic device of claim 11,
wherein the first conductive material includes aluminum, and
wherein the side member includes an outer surface exposed to an outside of the electronic device and an anodized layer on the outer surface.

13. The electronic device of claim 12, wherein the conductive pins include outer surfaces exposed to an outside of the electronic device without an anodized layer.

14. The electronic device of claim 11, further comprising:
at least one magnetic element within the side member adjacent to the one portion of the side member, wherein the at least one conductive path includes a flexible conductive member configured to come into contact with the printed circuit board.

15. The electronic device of claim 11, further comprising:
an application processor positioned within the space, and operably connected to a middle plate facing a direction parallel to the printed circuit board and the conductive pins,
wherein the middle plate is formed of the first conductive material, and is structurally connected to the conductive pins.

* * * * *